US007158909B2

(12) United States Patent
Tarpo et al.

(10) Patent No.: US 7,158,909 B2
(45) Date of Patent: Jan. 2, 2007

(54) METHOD AND SYSTEM FOR TESTING SPAS

(75) Inventors: James L. Tarpo, Aliso Viejo, CA (US); Jeffrey A. Buchman, Mission Viejo, CA (US)

(73) Assignee: Balboa Instruments, Inc., Tustin, CA (US)

( * ) Notice: Subject to any disclaimer, the term of this patent is extended or adjusted under 35 U.S.C. 154(b) by 0 days.

(21) Appl. No.: 10/815,556

(22) Filed: Mar. 31, 2004

(65) Prior Publication Data

US 2005/0222786 A1 Oct. 6, 2005

(51) Int. Cl.
*G06F 19/00* (2006.01)

(52) U.S. Cl. .................................................... 702/118

(58) Field of Classification Search ................. 702/65, 702/182–185, 188, 189, 118, 117; 324/512
See application file for complete search history.

(56) References Cited

U.S. PATENT DOCUMENTS

| | | | | |
|---|---|---|---|---|
| 4,567,323 | A | 1/1986 | Lottes et al. | 179/18 B |
| 5,155,761 | A | 10/1992 | Hammond | 379/67 |
| 5,206,903 | A | 4/1993 | Kohler et al. | 379/309 |
| 5,291,550 | A | 3/1994 | Levy et al. | 379/242 |
| 5,299,260 | A | 3/1994 | Shaio | 379/265 |
| 5,309,513 | A | 5/1994 | Rose | 379/265 |
| 5,335,269 | A | 8/1994 | Steinlicht | 379/266 |
| 5,506,898 | A | 4/1996 | Costantini et al. | 379/266 |
| 5,537,470 | A | 7/1996 | Lee | 379/266 |
| 5,546,452 | A | 8/1996 | Andrews et al. | 379/219 |
| 5,559,720 | A | 9/1996 | Tompkins et al. | |
| 5,592,378 | A | 1/1997 | Cameron et al. | 395/227 |
| 5,594,726 | A | 1/1997 | Thompson et al. | 370/485 |
| 5,606,361 | A | 2/1997 | Davidsohn et al. | 348/14 |
| 5,627,884 | A | 5/1997 | Williams et al. | 379/67 |
| 5,684,872 | A | 11/1997 | Flockhart et al. | 379/266 |
| 5,724,092 | A | 3/1998 | Davidsohn et al. | 348/14 |
| 5,740,238 | A | 4/1998 | Flockhart et al. | 379/221 |
| 5,751,707 | A | 5/1998 | Voit et al. | 370/384 |
| 5,754,639 | A | 5/1998 | Flockhart et al. | 379/221 |
| 5,790,677 | A | 8/1998 | Fox et al. | 380/24 |
| 5,818,907 | A | 10/1998 | Maloney et al. | 379/34 |
| 5,825,869 | A | 10/1998 | Brooks et al. | 379/265 |
| 5,828,747 | A | 10/1998 | Fisher et al. | 379/309 |
| 5,839,117 | A | 11/1998 | Cameron et al. | 705/27 |
| 5,875,437 | A | 2/1999 | Atkins | 705/40 |

(Continued)

FOREIGN PATENT DOCUMENTS

EP 0 740 450 A2 10/1996

(Continued)

OTHER PUBLICATIONS

Doo-Hyun Kim et al. "Collaborative Multimedia Middleware Architecture and Advanced Internet Call Center"; ProceedingsInternational Conference on Information Networking (Jan. 31, 2001), pp. 246-250.

(Continued)

*Primary Examiner*—Edward Raymond
(74) *Attorney, Agent, or Firm*—Larry K. Roberts

(57) ABSTRACT

A test system and method for testing a spa system which includes a spa tub for holding water, an electronic controller system which controls the spa system functions, and one or more controlled devices. The system and method exercises the controlled devices during a testing regime, and monitors electrical current drawn by the spa system during the testing regime. The electrical current drawn by the spa system during the testing regime can be compared with an expected current draw specification.

40 Claims, 21 Drawing Sheets

U.S. PATENT DOCUMENTS

| | | | |
|---|---|---|---|
| 5,880,720 A | 3/1999 | Iwafune et al. | 345/327 |
| 5,884,032 A | 3/1999 | Bateman et al. | 395/200.34 |
| 5,897,622 A | 4/1999 | Blinn et al. | 705/26 |
| 5,903,641 A | 5/1999 | Tonisson | 379/266 |
| 5,903,877 A | 5/1999 | Berkowitz et al. | 705/26 |
| 5,905,793 A | 5/1999 | Flockhart et al. | 379/266 |
| 5,943,416 A | 8/1999 | Gisby | 379/265 |
| 5,982,873 A | 11/1999 | Flockhart et al. | 379/266 |
| 6,000,832 A | 12/1999 | Franklin et al. | 364/479.02 |
| 6,044,205 A | 3/2000 | Reed et al. | 395/200.31 |
| 6,049,547 A | 4/2000 | Fisher et al. | 370/412 |
| 6,064,730 A | 5/2000 | Ginsberg | 379/265 |
| 6,064,731 A | 5/2000 | Flockhart et al. | 379/265 |
| 6,084,954 A | 7/2000 | Harless et al. | 379/140 |
| 6,088,441 A | 7/2000 | Flockhart et al. | 379/265 |
| 6,151,571 A | 11/2000 | Pertrushin | 704/209 |
| 6,163,607 A | 12/2000 | Bogart et al. | 379/266 |
| 6,173,053 B1 | 1/2001 | Bogart et al. | 379/266 |
| 6,192,122 B1 | 2/2001 | Flockhart et al. | 379/266 |
| 6,259,969 B1 | 7/2001 | Tackett et al. | 700/264 |
| 6,275,806 B1 | 8/2001 | Pertrushin | 704/272 |
| 6,275,991 B1 | 8/2001 | Erlin | 725/141 |
| 6,278,777 B1 | 8/2001 | Morley et al. | 379/265 |
| 6,282,370 B1 | 8/2001 | Cline et al. | |
| 6,292,550 B1 | 9/2001 | Burritt | 379/201 |
| 6,295,353 B1 | 9/2001 | Flockhart et al. | 379/265 |
| 6,353,810 B1 | 3/2002 | Petrushin | 704/236 |
| 6,366,668 B1 | 4/2002 | Borst et al. | 379/266.04 |
| 6,389,028 B1 | 5/2002 | Bondarenko et al. | 370/401 |
| 6,389,132 B1 | 5/2002 | Price et al. | 379/265 |
| 6,389,400 B1 | 5/2002 | Bushey et al. | 705/7 |
| 6,427,137 B1 | 7/2002 | Petrushin | 704/273 |
| 6,430,282 B1 | 8/2002 | Bannister et al. | 379/211.02 |
| 6,449,356 B1 | 9/2002 | Dezonno | 379/265.01 |
| 6,453,038 B1 | 9/2002 | McFarlane et al. | 379/265.05 |
| 6,463,346 B1 | 10/2002 | Flockhart et al. | 700/102 |
| 6,463,415 B1 | 10/2002 | St. John | 704/273 |
| 6,480,826 B1 | 11/2002 | Pertrushin | 704/270 |
| 6,535,600 B1 | 3/2003 | Fisher et al. | 379/265.12 |
| 6,587,739 B1 * | 7/2003 | Abrams et al. | 700/83 |
| 6,597,685 B1 | 7/2003 | Miloslavsky et al. | 370/352 |
| 6,643,108 B1 | 11/2003 | Cline et al. | |
| 6,676,831 B1 | 1/2004 | Wolfe | |
| 6,747,367 B1 * | 6/2004 | Cline et al. | 307/11 |
| 2001/0056349 A1 | 12/2001 | St. John | 704/270 |
| 2002/0002460 A1 | 1/2002 | Pertrushin | 704/270 |
| 2002/0002464 A1 | 1/2002 | Petrushin | 704/275 |
| 2002/0010587 A1 | 1/2002 | Pertrushin | 704/275 |
| 2002/0118816 A1 | 8/2002 | Flockhart et al. | 379/265.12 |
| 2002/0181692 A1 | 12/2002 | Flockhart et al. | 379/265.02 |
| 2002/0194002 A1 | 12/2002 | Petrushin | 704/270 |
| 2003/0171111 A1 | 9/2003 | Clark | |

FOREIGN PATENT DOCUMENTS

| | | |
|---|---|---|
| EP | 0 829 996 A2 | 3/1998 |
| EP | 0 855 826 A2 | 7/1998 |
| EP | 0 866 407 A1 | 9/1998 |
| WO | WO 97/28635 | 8/1997 |

OTHER PUBLICATIONS

Presentation by Victor Zue, *The MIT Ox90ygen Project*, MIT Laboratory for Computer Science (Apr. 25-26, 2000).
MIT Project Oxygen, *Pervasive, Human-Centered Computing* (MIT Laboratory for Computer Science) (Jun. 2000).
E. Noth et al., "Research Issues for the Next Generation Spoken"; University of Erlangen-Nuremberg, Bavarian Research Centre for Knowledge-Based Systems, at http://www5.informatik.unl-erlangen.de/literature/psdir/1999/Noeth99:RIF.ps.gz.
L.F. Lamel and J.L. Gauvain, Language Identification Using Phone-Based Acoustic Likelihoods, ICASSP-94, 4 pages.
John H.L. Hansen and Levent M. Arsian, *Foreign Accent Classificatino Using Source Generator Based Prosodic Features*, IEEE Proc. ICASSP, vol. 1, pp. 836-839, Detroit USA (May 1995).
Levent M. Arsian and John H.L. Hansen, *Language Accent Classification in American English*, Robust Speech Processing Laboratory, Duke University Department of Electrical Engineering, Durham, NC, Technical Report RSPL-96-7, revised Jan. 29, 1996.
Levent M. Arsian, *Foreign Accent Classification In American English*, Department of Electrical Computer Engineering, Duke University, Thesis, pp. 1-200 (1996).
U.S. Appl. No. 10/815,534, filed Mar. 31, 2004, Kiefhaber.
U.S. Appl. No. 10/815,584, filed Mar. 31, 2004, Kiefhaber.
No Author, "When Talk Isn't Cheap" Sm@rt Reseller, v. 3, No. 13 (Apr. 3, 2000), p. 50.
No Author, "eGain's Commerce 2000 Platform Sets New Standard for eCommerce Customer Communications" Business Wire (Nov. 15, 1999).
TestStand and LabView Automate PCB Functional Test for Lifline Systems Telephone and Communicator, Bailey et al., http://sine.ni.com/csol/cds/item/vw/p/id/450/nid/124100.
Customer Solutions, Kartikeya Fotedar, http://sine/ni.com/csol/cds/item/vw/p/id/64/nid/124200, undated.
Functional Test Case Study: Traffic Management Systems, http://www.thepeakgroup.com/peakpro/functest/case_study_trafficma . . . undated.

* cited by examiner

FAST Station Results

Result: PASS

| | | | | | |
|---|---|---|---|---|---|
| **Spa Model:** | Ultra-2000 | **Exterior Color:** | Grey | **Test Station:** | 15 |
| **Serial Number:** | 0012345 | **Tub Material:** | Red | **Script File:** | Demo0212-Nc System |
| **Date Tested:** | 02/06/36 23:42:52 | **Tub Color:** | | **Total Fails:** | 0 |

| Time | Meas Name | Measurement | Min | Max | Result |
|---|---|---|---|---|---|
| 23:35:08 | First Set Of Instructions | Pass | | | Pass |
| 23:35:08 | *** Start of Test *** | | | | |
| 23:35:33 | Pump 1 ADCM High Verification | High | EQ | High | Pass |
| 23:35:51 | Pump 2 ADCM High Verification | High | EQ | High | Pass |
| 23:36:04 | Pump 2 ADCM Off Verification | Off | EQ | Off | Pass |
| 23:36:18 | Blower ADCM High Verification | High | EQ | High | Pass |
| 23:36:20 | Blower ADCM Off Verification | Off | EQ | Off | Pass |
| 23:36:28 | Light ADCM High Verification | High | EQ | High | Pass |
| 23:36:31 | Light ADCM Off Verification | Off | EQ | Off | Pass |
| 23:36:39 | Fiber ADCM High Verification | Fiber+Wheel | EQ | Fiber+Wheel | Pass |
| 23:36:48 | Fiber ADCM Off Verification | Fiber | EQ | Fiber | Pass |
| 23:36:56 | Fiber ADCM Off Verification | Off | EQ | Off | Pass |
| 23:36:56 | Heater ADCM On Verification | On | EQ | On | Pass |

FIG. 11C

FAST Station Results

Result: FAIL

| | | | | | |
|---|---|---|---|---|---|
| Spa Model: | Ultra-2000 | Exterior Color: | Grey | Test Station: | 15 |
| Serial Number: | 0012345 | Tub Material: | Red | Script File: | Demo0218.txt |
| Date Tested: | 02/06/36 23:34:31 | Tub Color: | | Total Fails: | 7 |

| Time | Meas Name | Measurement | Min | Max | Result |
|---|---|---|---|---|---|
| 23:30:51 | Dip Switch A check | 8 | EQ | 6 | Pass |
| 23:30:51 | Dip Switch B check | CE | EQ | CE | Pass |
| 23:30:57 | First Set Of Instructions | Pass | | | Pass |
| 23:30:57 | *** Start of Test *** | | | | |
| 23:31:31 | Pump 1 High Current | 0.000 Amps | 11.320 | 13.320 | Fail ** |
| 23:31:31 | ADCM Pump 1 High Verification | High | EQ | High | Pass |
| 23:31:54 | Pump 2 Low Current | 0.000 Amps | 3.000 | 4.000 | Fail ** |
| 23:31:54 | ADCM Pump 2 Low Verification | Low | EQ | Low | Pass |
| 23:32:19 | Pump 2 High Current | 0.000 Amps | 7.000 | 9.000 | Fail ** |
| 23:32:20 | ADCM Pump 2 High Verification | High | EQ | High | Pass |
| 23:32:28 | ADCM Pump 2 Off Verification | Off | EQ | Off | Pass |
| 23:32:48 | Blower High Current | 0.000 Amps | 3.000 | 5.000 | Fail ** |
| 23:32:48 | ADCM Blower High Verification | High | EQ | High | Pass |
| 23:32:50 | ADCM Blower Off Verification | Off | EQ | Off | Pass |
| 23:32:59 | ADCM Light High Verification | High | EQ | High | Pass |
| 23:33:01 | ADCM Light Off Verification | Off | EQ | Off | Pass |
| 23:33:11 | Fiber+Wheel Current | 0.000 Amps | 1.000 | 1.800 | Fail ** |
| 23:33:11 | ADCM Fiber+Wheel Verification | Fiber+Wheel | EQ | Fiber+Wheel | Pass |
| 23:33:20 | ADCM Fiber Only Verification | Fiber | EQ | Fiber | Pass |
| 23:33:29 | ADCM Fiber Off Verification | Off | EQ | Off | Pass |
| 23:33:31 | Heater Current | 0.000 Amps | 18.000 | 20.000 | Fail ** |
| 23:33:32 | ADCM Heater On Verification | On | EQ | On | Pass |
| 23:33:58 | Water Temp @98 | 74.000 degrees | 97.250 | 98.750 | Fail ** |
| 23:34:26 | TEST COMPLETE | | | | |

FIG. 11D

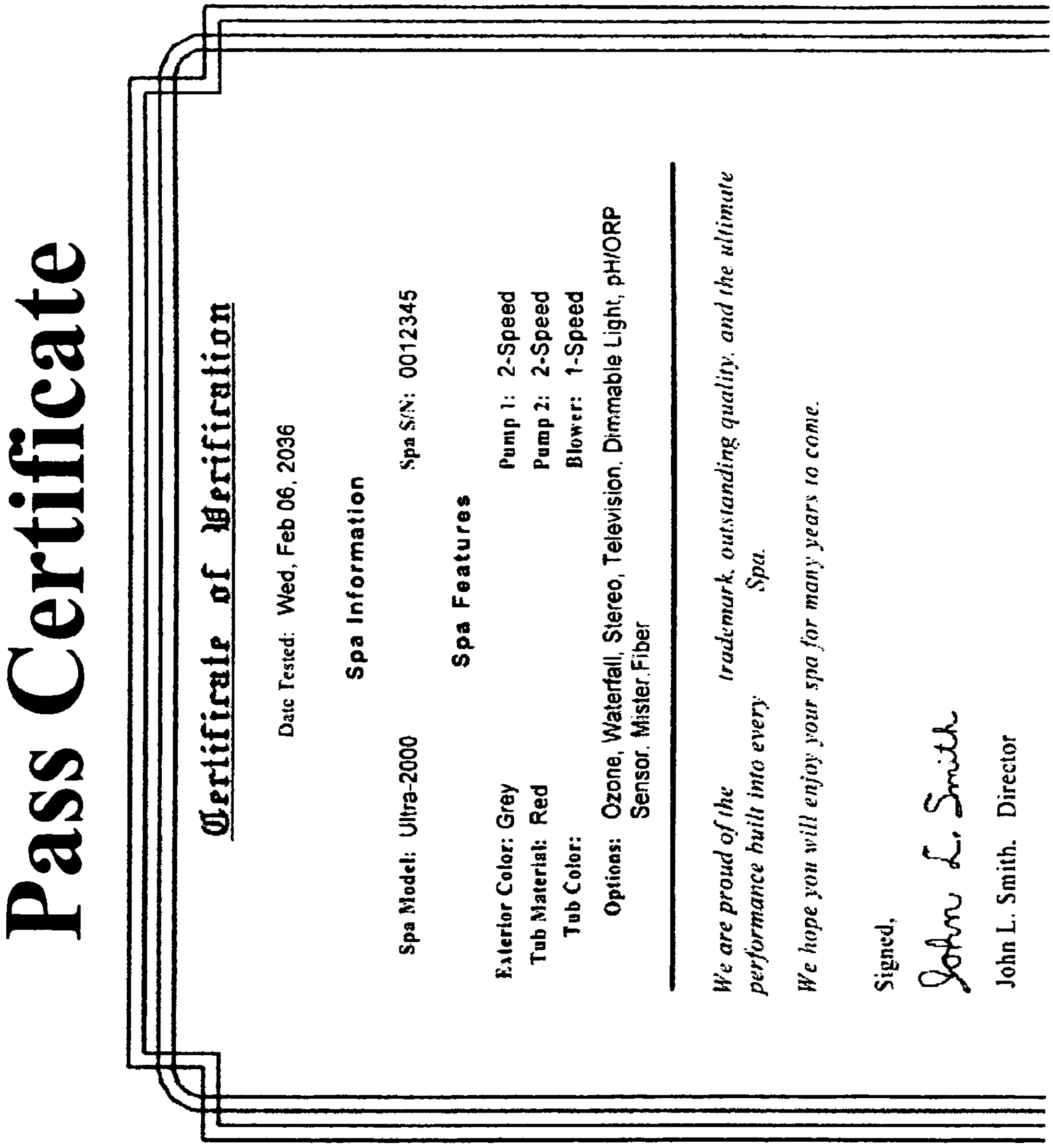

Pass Certificate

Certificate of Verification

Date Tested: Wed, Feb 06, 2036

Spa Information

Spa Model: Ultra-2000 Spa S/N: 0012345

Spa Features

Exterior Color: Grey Pump 1: 2-Speed
Tub Material: Red Pump 2: 2-Speed
Tub Color: Blower: 1-Speed Options: Ozone, Waterfall, Stereo, Television, Dimmable Light, pH/ORP Sensor, Mister,Fiber

*We are proud of the trademark, outstanding quality, and the ultimate performance built into every Spa.*

*We hope you will enjoy your spa for many years to come.*

Signed,

John L. Smith

John L. Smith. Director

FIG. 11E

METHOD AND SYSTEM FOR TESTING SPAS

A CD-R compact disc is submitted in duplicate, and contains an appendix in the form of a file titled "MS2000-8000 Long.txt", created Mar. 30, 2004, with a file size of 30,367 bytes (30,720 bytes on disc), the entire contents of which are incorporated herein by this reference.

BACKGROUND

Prefabricated spa systems have become popular, and typically include the spa tub, heater, water pump, electronic controller system, lighting elements and associated plumbing. The spa system can be assembled at a manufacturer's factory or distribution center, before being delivered to the customer's site for installation.

The spa systems typically have several devices or systems under control of the system controller, and these must be connected properly in the system to provide intended operational capability of the spa system. If the spa system is delivered to a customer and does not operate properly, a technician must be dispatched to the installation site to troubleshoot and make repairs.

It would be advantageous to provide a method for testing spa systems before shipment from the assembly location or shipment to an installation location.

It would further be advantageous to provide a test system for testing an assembled spa system before shipment from an assembly location or shipment to an installation location.

BRIEF DESCRIPTION OF THE DRAWINGS

Features and advantages of the disclosure will readily be appreciated by persons skilled in the art from the following detailed description when read in conjunction with the drawing wherein:

FIGS. 11C–11E depict respectively an exemplary pass test report, a fail test report, and a spa certificate.

DETAILED DESCRIPTION

Figure 1:
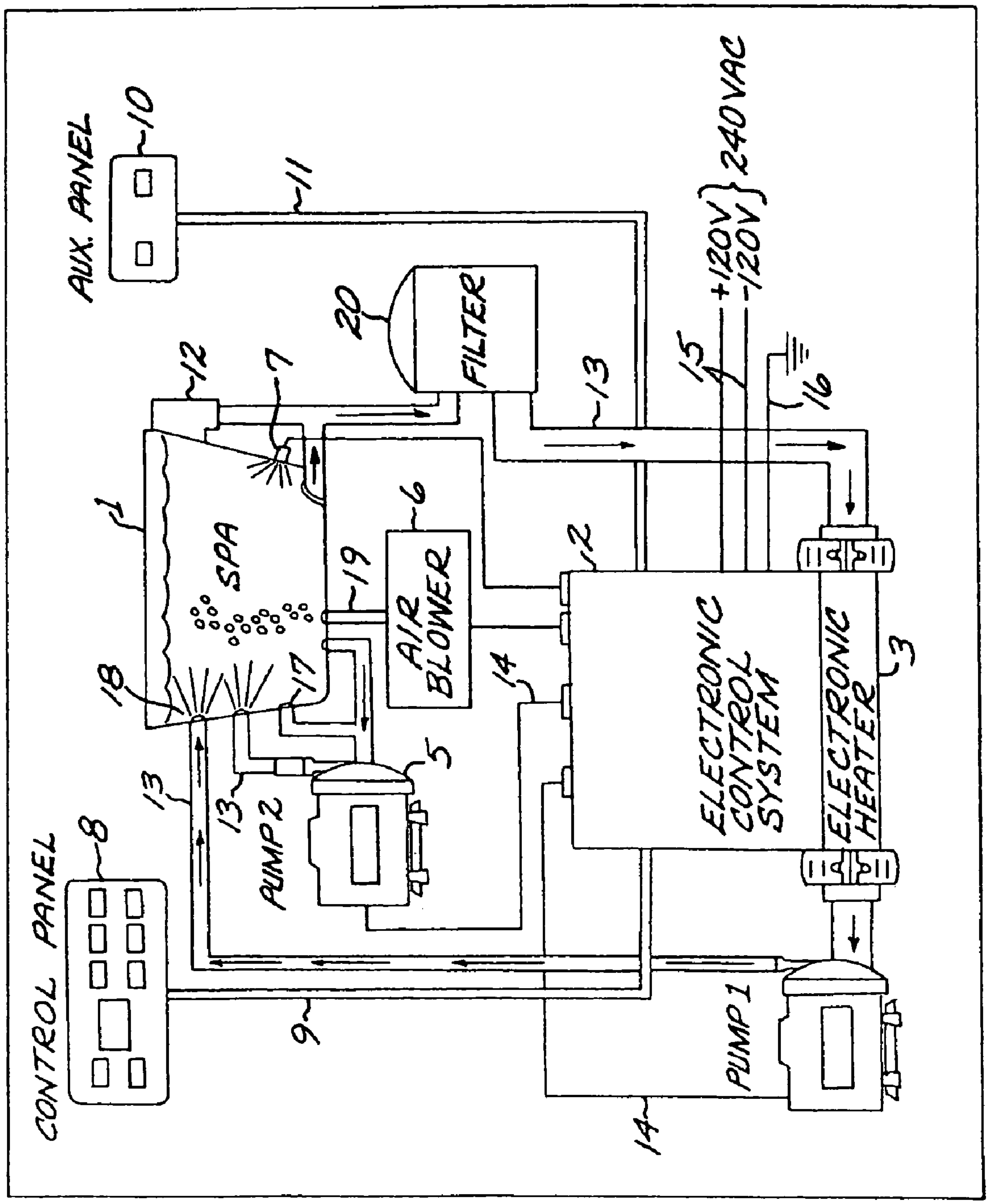
FIG. 1 is a diagrammatic diagram of a spa system with typical equipment and plumbing installed.

In the following detailed description and in the several figures of the drawing, like elements are identified with like reference numerals.

FIG. 1 illustrates an overall block diagram of a spa system with typical equipment and plumbing installed. The system includes a spa 1 for bathers with water, and a control system 2 to activate and manage the various parameters of the spa. Connected to the spa 1 through a series of plumbing lines 13 are pumps 4 and 5 for pumping water, a skimmer 12 for cleaning the surface of the spa, a filter 20 for removing particulate impurities in the water, an air blower 6 for delivering therapy bubbles to the spa through air pipe 19, and an electric heater 3 for maintaining the temperature of the spa at a temperature set by the user. The heater 3 in this embodiment is an electric heater, but a gas heater can be used for this purpose also. Generally, a light 7 is provided for internal illumination of the water.

Service voltage power is supplied to the spa control system at electrical service wiring 15, which can be 120V or 240V single phase 60 cycle, 220V single phase 50 cycle, or any other generally accepted power service suitable for commercial or residential service. An earth ground 16 is connected to the control system and there through to all electrical components which carry service voltage power and all metal parts. Electrically connected to the control system through respective cables 9 and 11 are the control panels 8 and 10. All components powered by the control system are connected by cables 14 suitable for carrying appropriate levels of voltage and current to properly operate the spa.

Water is drawn to the plumbing system generally through the skimmer 12 or suction fittings 17, and discharged back into the spa through therapy jets 18.

Figure 2:
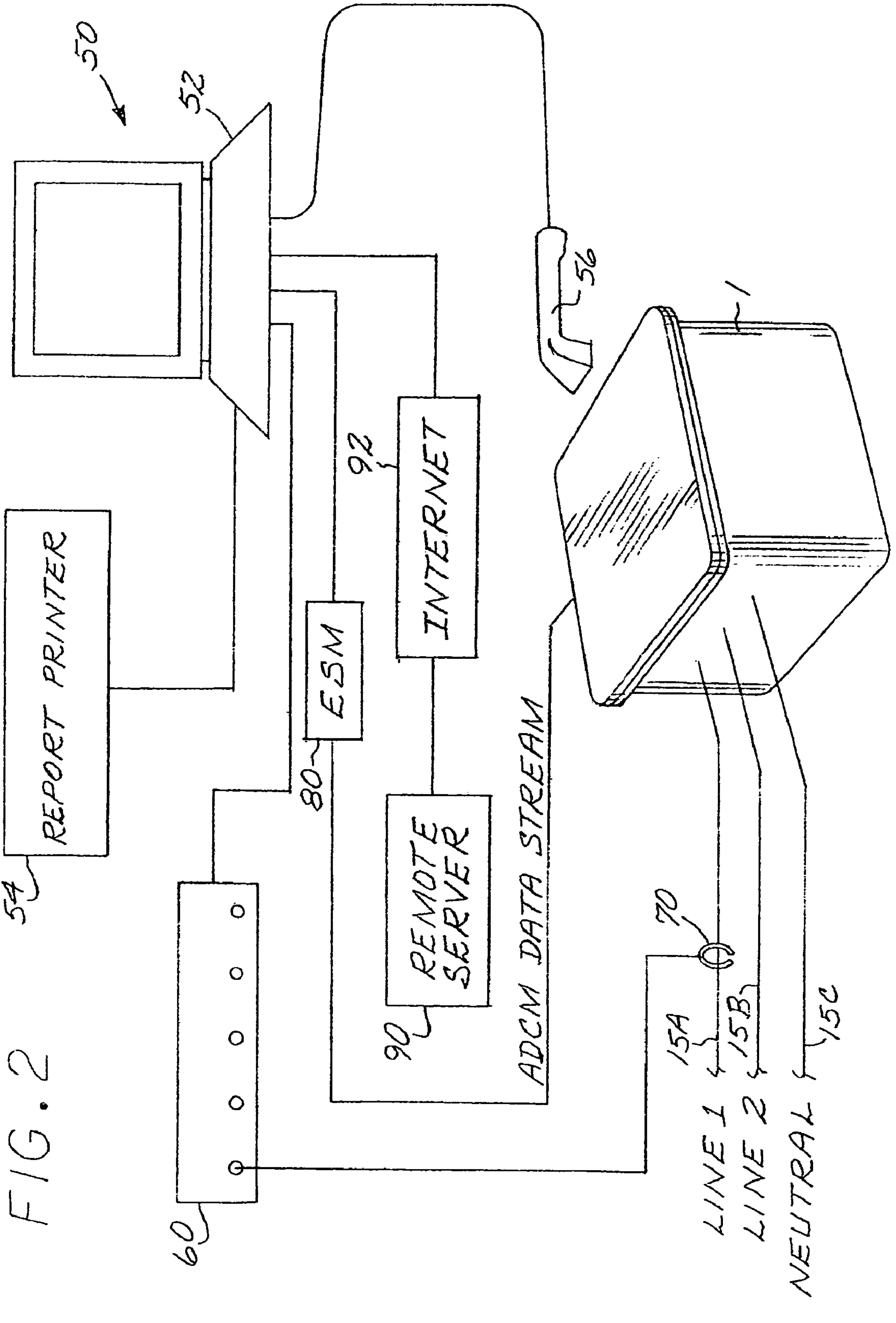
FIG. 2 is a diagrammatic block diagram illustrative of an exemplary embodiment of a spa test system.

An exemplary embodiment of a spa test system 50 is shown in diagrammatic form in FIG. 2, for testing features of a spa 1. This exemplary system includes a personal computer or work station 52, connected to a printer 54 for printing test reports and certificates and other records. A bar code scanner 56 is connected to an I/O port of the computer 52, and can be used to scan a bar code on the spa under test. This can facilitate automated capture of data pertaining to the spa under test, e.g, the spa system serial number as well as the serial number of spa components such as pumps. The computer display monitor can include touchscreen capability. Alternatively, or in addition, the user can interact with the computer by keyboard, mouse or other input means.

The system 50 further includes a data acquisition module 60 which is connected to a USB port of the computer system. The module 60 has an input port connected to a current sensor coupled to line 1 of service lines 15A–15C, to provide a means of power input current sensing.

In an exemplary embodiment, the data acquisition module is a commercially available device, e.g. the National Instruments DAQPad-602-E, a rack-mountable device with a 68-pin SCSI II male connector. This device is a USB-compatible multi-function data acquisition device, with analog, digital and timing I/O functions. This exemplary device includes a 12-bit analog-to-digital converter (ADC), two digital-to-analog converters (DACs), TTL-compatible digital I/O and counter-timers for timing I/O. Of course, other types of circuits and devices can alternatively be used in the system.

Figure 3:
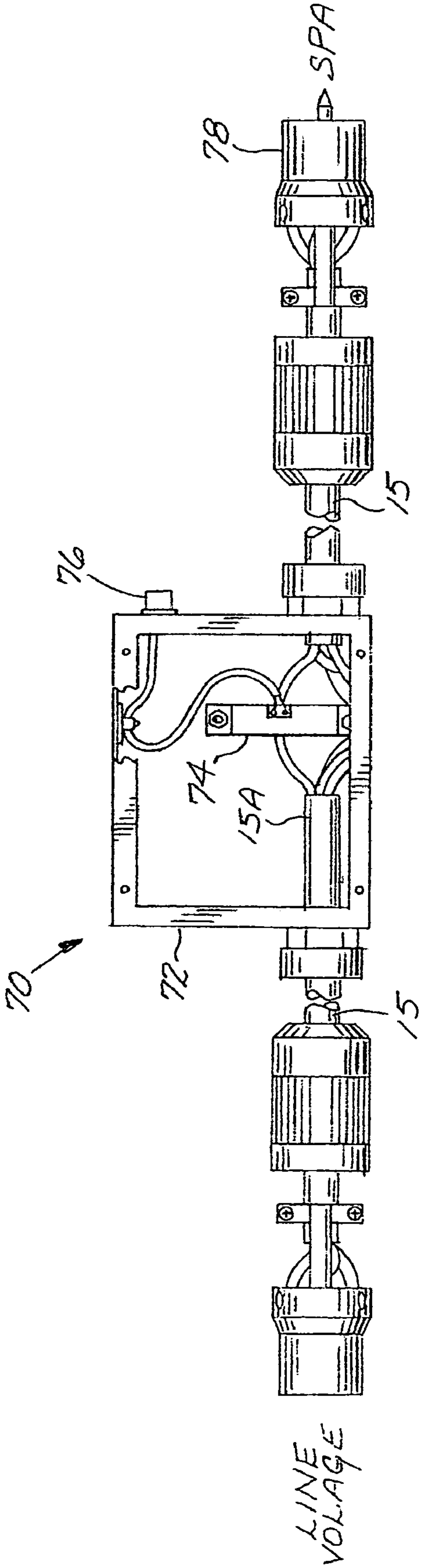
FIG. 3 is a schematic illustration of an exemplary embodiment of a current sensor configuration.

The system 50 further includes a current sensor 70 for sensing the current being drawn by the spa 1. FIG. 3 is a schematic illustration of an exemplary embodiment of a current sensor configuration suitable for the purpose. The service wiring 15 is passed through the sensor 70 from the line voltage source to the spa 1 under test. One service wire 15A is connected through a sensor module 74 and is passed on with the other wires (15B, ground 16 and neutral 15C) to a wiring plug 78 for connection to the line voltage connector for the spa 1. The sensor module senses the current being drawn on wire 15A, and provides a dc readout voltage at port 76. In an exemplary embodiment, the sensor module 74 is a commercially available unit, e.g., the Hawkeye H922 current transducer marketed by Veris Industries. The dc readout voltage for this transducer is a linear output indicative of the sensed amperage.

The port 76 of the current sensor is connected to the data acquisition module, where the dc readout voltage is converted to digital form, and the digitized value is passed to the test station computer for use in the spa test.

In an exemplary embodiment, a serial port of the test station computer 52 is connected to a serial port of the electronic controller of the spa 1 through a voltage level shifting adapter 80. The adapter 80 converts between RS-232 signal levels of the computer serial port and SPI protocol TTL signal levels which are compatible with the microcomputer comprising the electronic controller of the spa. In an exemplary embodiment, the adapter module 80 can include a MAX 232 RS-232 driver receiver device, marketed by Maxim, or an equivalent, for performing the level shifting. For some applications, the adapter 80 may be omitted, e.g. in a design in which the TTL conversion is performed on the controller board of the spa, and RS-232 signals are communicated between the test station computer and an RS-232 port on the spa controller board. A serial data stream can be passed between the computer and the spa controller, allowing data and commands to be passed from the computer to the spa controller, and for status and other data to be passed from the spa to the computer 52.

In an exemplary embodiment, the test station 50 is connected via an internet connection to a remote server site 90, which can be employed to store and process test result files uploaded by the test station to the remote server. In other embodiments, the test station does not include a facility for uploading the test files.

Figure 4:
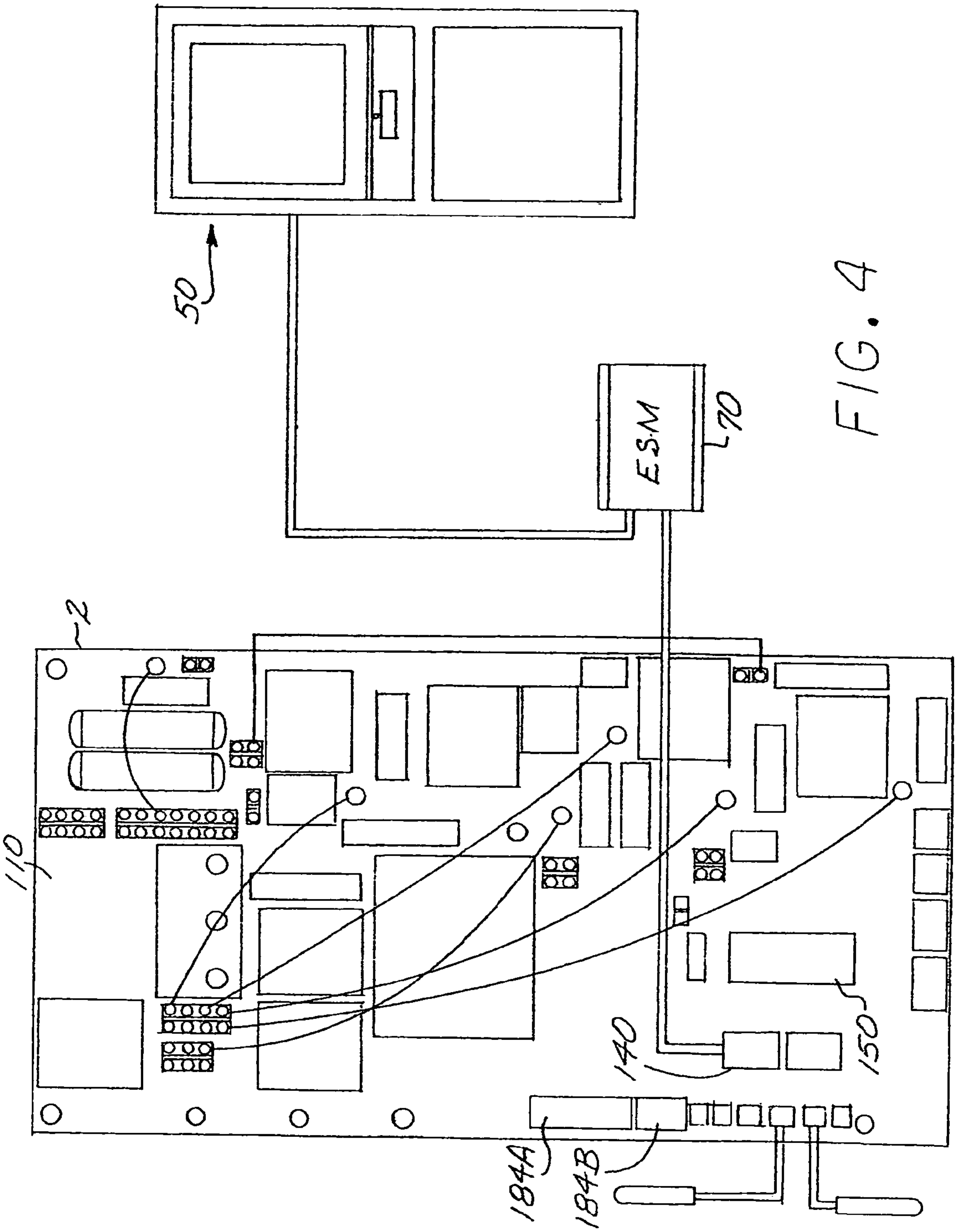
FIG. 4 schematically illustrates an exemplary embodiment of a spa controller comprising a controller printed circuit board.

FIG. 4 schematically illustrates an exemplary embodiment of a spa controller 2 comprising a controller printed circuit board 110, having a conductor pattern formed thereon and populated by various components, including relays, terminal blocks, dip switch blocks 184A, 184B, and a microcomputer 150. The controller board can employ power and signal routing features as described in pending application Ser. No. 10/677,510, entitled Controller System for Bathing Installation, filed Oct. 2, 2003, the entire contents of which are incorporated herein. In an exemplary embodiment, the microcomputer is a PIC 18F6620 microcomputer, although other microprocessors can alternatively be employed. The controller 2 further includes a serial data bus port 140 which is connected to the test station computer 52 through the level shifting module 70. In an exemplary embodiment, the port 140 provides full duplex serial data bus connections allowing signals to be passed in both directions simultaneously between the computer and the controller 2. The terminals of the port 140 are coupled to terminals of the microcomputer 150, e.g. through buffer circuits well known in the art.

Figure 5B:
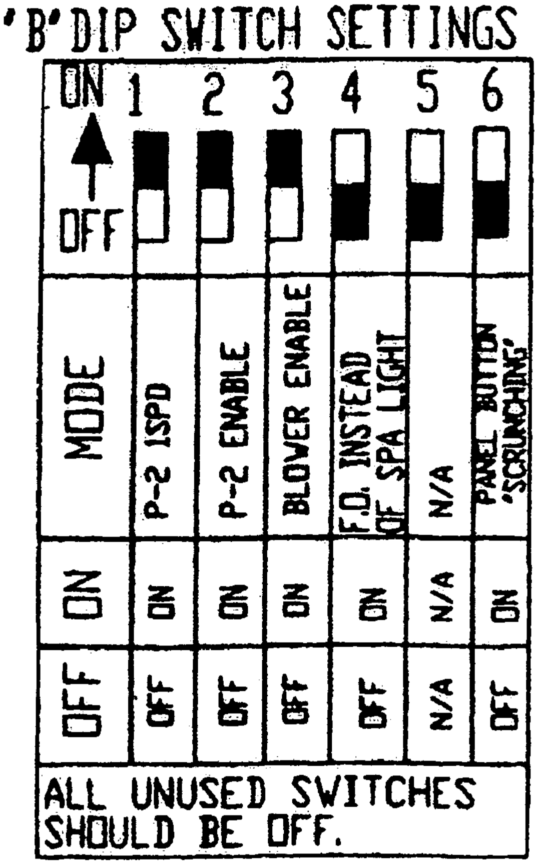
FIGS. 5A and 5B set out in table form an exemplary set of system parameters which are selectable by DIP switch settings on the spa controller.
Figure 5A:
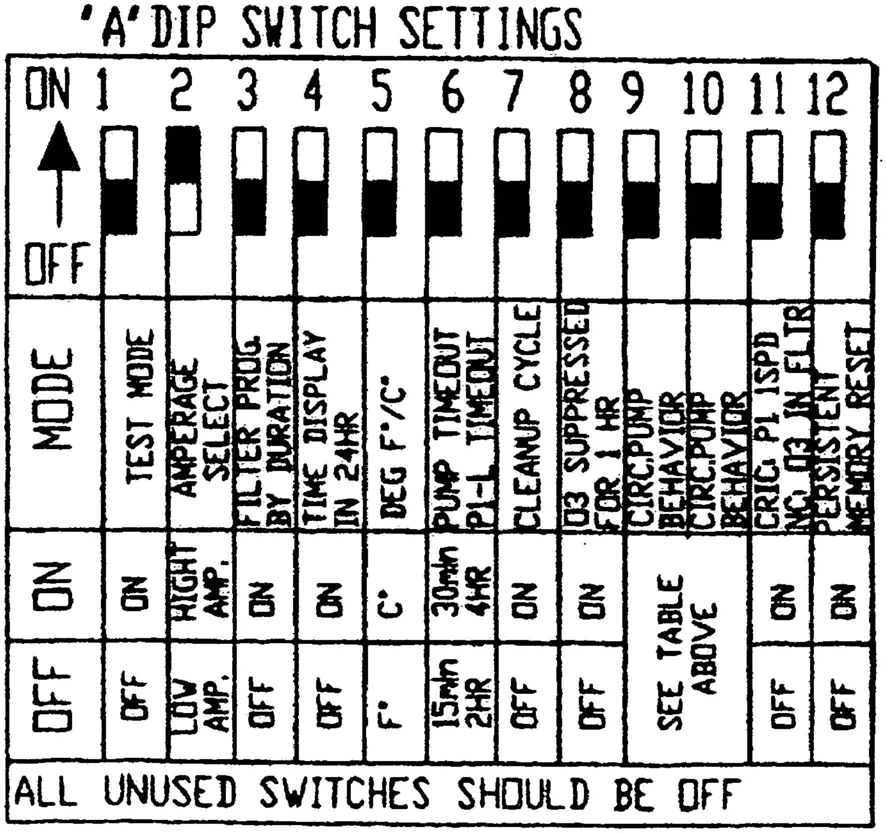

The controller 2 in an exemplary embodiment includes two DIP switch assemblies 184A, 184B, which can be set at the factory or by a service technician to setting indicative of settings of the controller or a particular configuration of the spa 1. FIGS. 5A and 5B set out in table form an exemplary set of system parameters which are selectable by the DIP switch settings. The DIP switch settings can be read by the microprocessor 150, and can be passed to the test station through ADCM (advanced diagnostic control and monitoring) port 140 during a test of the spa.

Data can therefore be exchanged between the spa controller 2 and external systems such as the test station computer. In an exemplary embodiment, the data can be in the form of data packets of a predetermined protocol.

In an exemplary embodiment, the adapter 80 receives SPI (Serial Peripheral Interface Protocol) data from the spa controller 2, and RS-232 serial data from the test station computer, and performs a conversion between the voltage levels and timing of the SPI and RS-232 signals. The burst clock rate for the SPI data in this exemplary embodiment is 375 kHz (24 MHz/64), meaning the worst possible case would be 46.875 microseconds between bytes, but if necessary the controller can space the bytes somewhat further apart. The bit rate for the RS-232 serial communication data will be 38400 baud, meaning characters may be no more than about 260 microseconds apart. In other embodiments, the spa controller 2 can include an integrated adapter, so that it receives the RS-232 data from the test station computer directly.

The adapter 80 detects the start of an SPI transmission. For example, it can do this by detecting a timeout after the last (successful or unsuccessful) transmission, or by monitoring (a copy of) the SPI select signal manually.

Upon the start of an SPI transmission, the data coming from the spa controller 2 can be in the following format in one exemplary embodiment:

| | |
|---|---|
| byte | magic-1 (0x55) |
| byte | magic-2 (0x5A) |
| byte | inverted Length |
| byte | length (length of everything after this 'length' byte but before 'checksum' byte) |
| byte | packet type |
| byte | data bytes . . . |
| byte | checksum (an 8-bit checksum of everything after 'length' byte but before this 'checksum' byte) |

The SPI transmission will end after and exactly after the 'checksum' byte. This could be used as another level of verification (specifically, if the transmission ends before the 'checksum' byte, the transmission should be considered invalid).

The format of the data coming from the adapter 80 will be similar:

| | |
|---|---|
| byte | magic-1 (0x55) |
| byte | magic-2 (0x5A) |

-continued

| | |
|---|---|
| byte | inverted Length |
| byte | length (length of everything after this 'length' byte but before 'checksum' byte) |
| byte | packet Type |
| byte | . . . data . . . |
| byte | checksum (an 8-bit checksum of everything after 'length' byte but before this 'checksum' byte) |

In an exemplary embodiment, the data is sent in both directions in the same phase; i.e., while the spa controller 2 is sending magic-1, the adapter 80 is also sending magic-1, etc. Magic-1 and Magic-2 are bit sequences that would be highly unusual to find in real data, and is used for synchronization. The adapter 80 tells the spa controller 2 the length it has to send before it knows how many bytes the controller will send (and thus for how many bytes the controller will send clocks). Thus if the length the adapter 80 sends is greater than the length the controller 2 sends, the adapter will use the length the controller sends to determine how much to actually send and when to send the checksum byte, even though it will find out too late to send its 'invertedLength' and 'length' parameters correctly.

In an exemplary embodiment, the adapter passes through as much data as it gets as soon as it reasonably can, in each direction independently. Actual packets from the external source, e.g., the test station computer, may or may not be broken up into multiple SPI packets, and/or one packet from the computer 52 may end and another may start within one SPI packet.

Communication from the test station computer 52 in an exemplary embodiment is full duplex asynchronous serial at 38.4 kbaud, 8-N-1, i.e. 8 data bits, no parity, 1 stop bit. Examples of the data format are summarized in the Table below.

| Packet Type | Packet Name |
|---|---|
| 0x01 | Status Update |
| 0x02 | Board and System Serials |
| 0x03 | Fault Log Entries |
| 0x81 | Button Push |
| 0x82 | Settings Poke |
| 0x83 | Programming Poke |
| 0x84 | Requests |

In an exemplary embodiment, the status packet includes status data about the configuration of the spa under test, its current status as well as that of the installed devices, and the states of the spa controller board DIP switch settings. The board and system serials packet can include serial number data for the controller 2 as well as for the installed devices in the device under test.

The fault log packets can include fault data which is logged by the spa controller and can be uploaded to the test station or to a remote server.

In an exemplary embodiment, the button push packet includes control commands or data for the spa controller to act on. These button commands can be issued by the test station during a test routine. The data in the packet can include a Button Metacode. In an exemplary embodiment, the Button Metacode is one of the following:

Temperature Up/Warm=1
Temperature Down/Cool=2
Temperature/UpDown=3
TimeChemistry=5
TimeOnly=6
ChemistryOnly=7
Mode=8
Invert=9
Jets1=11
Jets2=12
Jets3=13
Jets4=14
Blower=16
Spa Light=18
Fiber=19
EitherLight=20
Option=24
Mister=25
Color Kinetics Mode=26
Color Kinetics Option (Color/Speed)=27
Color Kinetics Intensity=28

The following metacodes are only effective when the receiving system is in Priming mode:

Pump 0 Only=50
Fiber Light Only=51
Fiber Wheel Only=52
Spa Light Only=53
Ozone Without Timeout=54
Pump 1 Only=55
Alarm=56

In an exemplary embodiment, the programming poke packet can be used to set the time on the spa controller, as well as filter programmable time values. The requests packet can be used to send instructions to the spa controller from the test station to return a board and serials packet, to transmit its fault log in a fault packet, to place the spa in a priming mode (during which most tests are conducted by the test station), or to transmit its configuration settings.

The settings poke packet can be used, in an exemplary embodiment, to lock the spa controller panel during tests, and to set the spa temperature for tests.

In an exemplary embodiment, early in each packet is a 'packetType' field. Its exact meaning may vary with the system software identification (SSID), but each packet includes the direction bit. For example, if bit 7 is "on" (0×81, for example), the packet has been sent to the spa controller 2, and does not include the SSID (in this exemplary embodiment, packets are sent to the controller 2 only once packets from the controller 2 have been received by the adapter 80, and so resending the SSID would be superfluous). If bit 7 of a given packet is "off" (0×01, for example), this signifies that the packet has been sent from the controller 2, and does include the SSID.

In one exemplary embodiment, all packets use an identical format up through the 'packetType' field. (This includes a two-byte magic, a one-byte length preceded by an inverted copy of itself, and a five-byte Chip Serial Number structure.) Furthermore, all packets sent from the controller use an identical format up through the 'ASSID_version' field.

In an exemplary embodiment, the spa controller 2 sends only Status Update packets unless it gets a Request packet asking for another type of packet. Only one other type of packet is sent at a time from the controller, and when there is another type of packet sent from the controller, it is only sent every other time. Thus there are always Status Update packets coming at least every other packet in this embodiment.

The data frequency is switchable for packets sent from the controller 2 in one exemplary embodiment. The slow (default) data frequency is a packet every 0.8 seconds; an exemplary fast data frequency is around 10 packets per second.

Figure 2A:
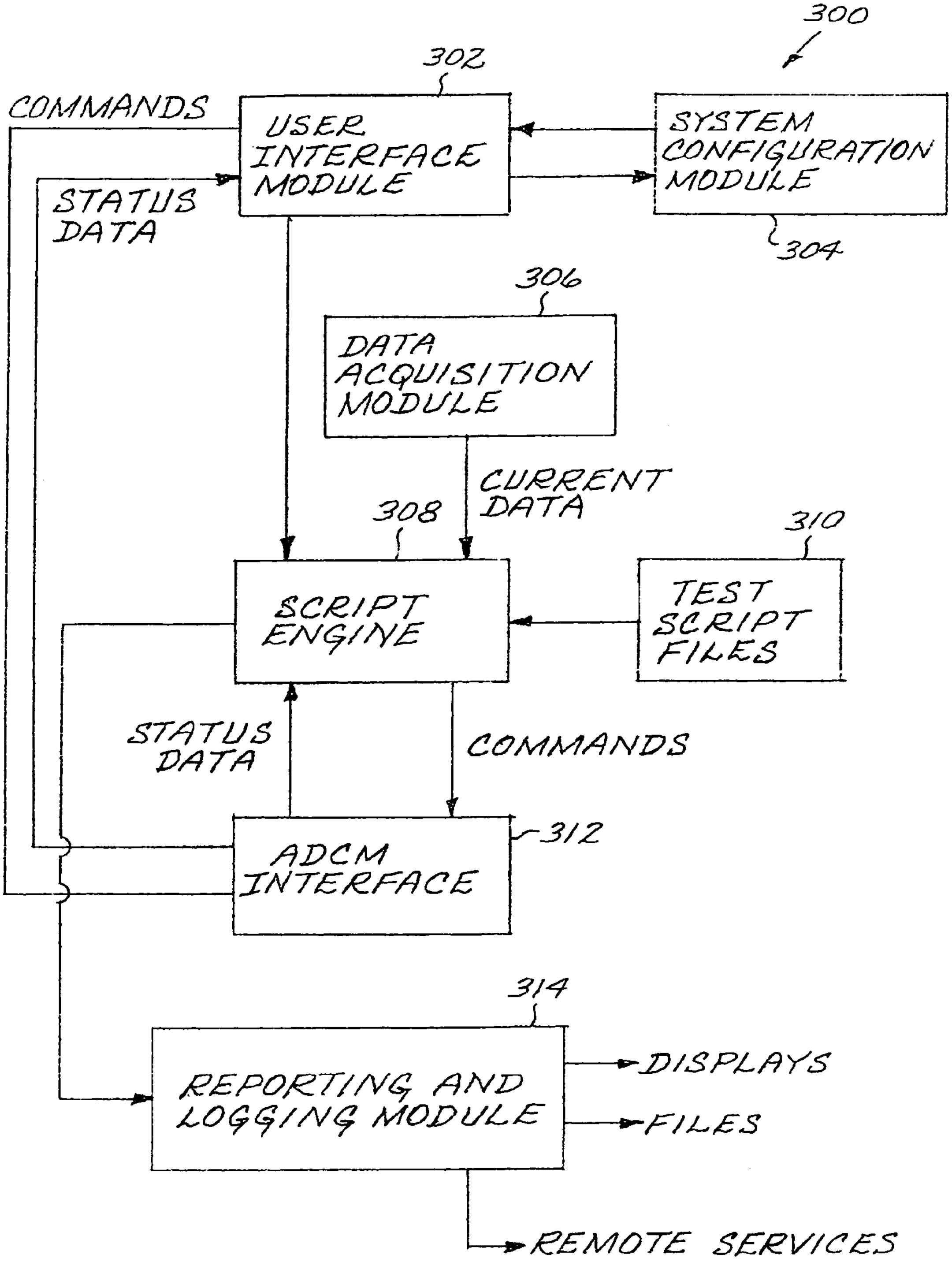
FIG. 2A is a functional block diagram of an exemplary embodiment of a compiled application for executing test scripts.

The test station computer 52 is programmed with a test algorithm designed to exercise the components of the spa under test. In one exemplary embodiment, the test algorithm is defined by test scripts which are run by a compiled Labview application installed on the test station computer 52. Labview is a commercially available program, marketed by National Instruments. The compiled program processes the test scripts which are designed to perform the test sequences. FIG. 2A is a functional block diagram of an exemplary embodiment of a compiled application 300 for executing the test scripts. The application includes a user interface module 302, which is responsive to user interface devices, such as the keyboard, mouse, touchscreen, e.g. to process button pushes. The user interface module exchanges data with a system configuration module 304, which stores data regarding the spa system configurations. A software data acquisition module 306 receives data from the module 60, to provide spa current data to a script engine 308. The script engine 308 is a Labview interpreter, which interprets and executes the test scripts comprising the test script files 310. The script engine 308 sends commands to an ADCM interface module 312, which formats the commands into appropriate serial data packets sent to the RS-232 serial port of the test computer connected to the adapter 70, and which interprets data from the serial port. The interface module 312 also receives commands from, and sends ADCM data to the user interface module 302. The script engine also provides test data to a reporting and logging module 314, which services the test station display to provide data displayed on the test station monitor, provides test result files, and provides remote services, such as sending test result files to a remote server.

An exemplary test script is set out in the Appendix set out in the incorporated file MS2000-8000 Long.txt. An exemplary spa test routine is described below. It will be understood that the following description is merely exemplary, and that other embodiments may implement different test scripts and routines.

Spa Test Overview The Spa Test Station 50 in this embodiment gives the user the opportunity to control and measure events and states of the spa in a highly repeatable manner. In an exemplary embodiment, this is achieved by running a Test Script that modifies the states of spa equipment (pumps, blowers, etc.) in the desired way while taking current draw measurements and serial ADCM status as confirmation of correct operation. In an exemplary embodiment, the spa test is a wet test, performed with water in the spa tub. The spa is filled with sufficient water for the test.

In an exemplary embodiment, two types of data are archived during a test run. One type is the Test Results Data. These results appear in text format on the main screen, and are logged to the local hard drive in the c:\Fast Spa Test\Test Results directory as the test runs. They can be subsequently transferred to a remote server site upon test completion, using an internet connection. A second type of data is ADCM data. This is serial status information from the controller, acquired at regular intervals and sent to the remote server, FTP site upon test completion. This "history of operation" logging provides the user several post-test troubleshooting tools. The data can be processed and viewed.

Upon completion of a test run, the following printed reports can be made available in an exemplary embodiment. A Test Report is a complete copy of all measurements taken during the test run. It is essentially a copy of the data that appears in the Test Results table during a test run. A second printed report is a Spa Certificate. If a test run is completed without any failures, the tester will optionally print out a certificate of verification for the spa.

An exemplary test regime carried out by the test station is described by the following process steps:

1. Initialize the test script variables, and check operations, e.g. check for correct spa water level, diverter valves set to center position, visual spa inspection.
2. Evaluate the spa system configuration for the spa under test.
3. Initialize the spa for test.
4. Main Test:
   a. Test Pump 1 operation.
   b. Test Pump 2 operation.
   c. Test Pump 3 operation.
   d. Test Pump 4 operation.
   e. Test Pump 5 operation.
   f. Test Blower operation.
   g. Test Spa light operation.
   h. Test Fiber Light operation.
   i. Test Mister operation.
   j. Test Option operation.
   k. Test Panel operation.
   l. Test Filter.
   m. Test Heater operation.
   n. Test maximum current load operation by turning on all spa current load components.
6. Reset Spa under test.
7. Print report and test certificate.
8. Optionally upload test results to remote server.

In an exemplary embodiment, the test station will set the spa controller to a priming mode to run the tests which do not involve the heater. This is a convenient mode which allows the non-heater components to be exercised. The spa controller in this embodiment is placed in an operating mode to test the heater operation, and the spa water temperature, i.e. a thermostat temperature, is set to a set point which will cause the heater to turn on in normal conditions. The spa current magnitude is monitored during the various tests to determine whether the current draw is within specifications as the respective spa components are turned on and off. Since the nominal current draw for each of the components and for each component state (e.g. low speed, high speed, etc.) is stored in advance in the spa configuration files on the test station, the application software compares the actual current as measured by the current sensor 70 to the nominal current for the respective device. There is also a test for the maximum current load, with all devices turned on.

The function and operation of an exemplary embodiment of a test station and test routines which can be run by this exemplary embodiment are described below.

Figure 6:
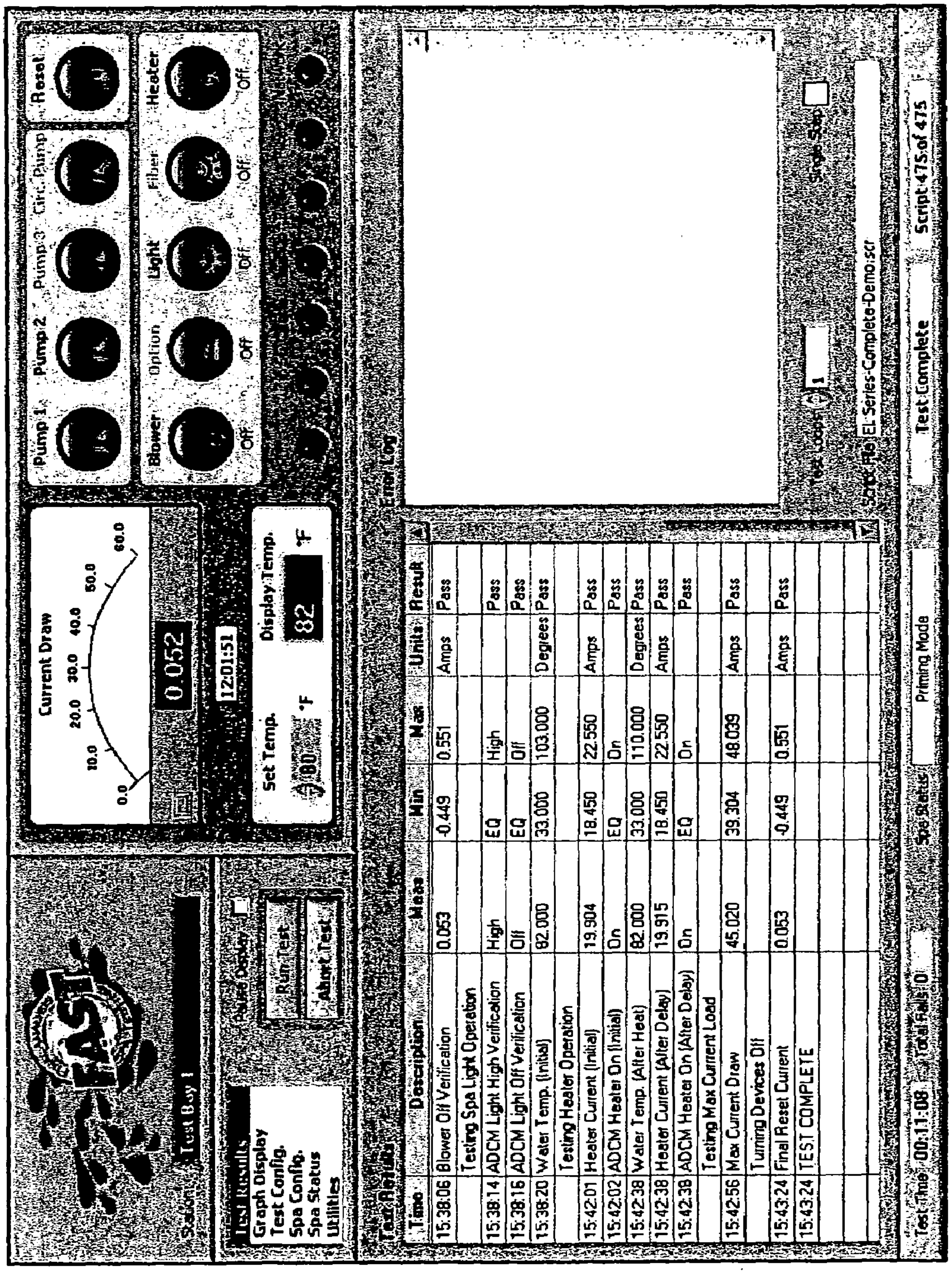
FIG. 6 shows a display screen shot of an exemplary application panel, or operator screen, as displayed on the test station display monitor.

Control and Display Section FIG. 6 shows a display screen shot of an exemplary application panel, or operator screen, as displayed on the test station display monitor. The upper section of the application panel on the test station display has several controls and indicators used to operate and monitor the application. The "station selector" control allows the user to connect to one of four spas. In this embodiment, only one spa at a time is tested. This selector is not enabled during a test run.

The "Tab Selection" Control (FIG. 6) is used to select the viewing tab. The available tabs for an exemplary embodiment, described more fully below, are Test Results, Graph Display, Test Configuration, Spa Configuration, Spa Status, and Utilities.

Checking the "Pause Delay" (FIG. 6) will pause the test results table display and the graph display. This allows the user to view information without the automatic scrolling feature of these two indicators being active.

The Current Display indicator (FIG. 6) shows the total current draw of the spa, as measured by the current sensor 70.

The Temperature Control/Display control (FIG. 6) indicates the currently programmed temperature as read from the spa controller. Additionally, it can be used to set the temperature. When the temperature is changed, the control will change color to indicate the change has been made. It will return to blue when the temperature is verified from the controller. Invalid temperatures are rejected by the controller in this embodiment.

The controls used to operate and monitor the various configured pumps, blowers, lights, etc., are displayed on the application panel (FIG. 6). All controls except for the Heater and Circulation pump (not user controllable), contain a push-button operation as well as an animation that represents the state of the device. These controls act as indicators during a test routine. When the test script is not running, the controls become buttons for interactive operation of the spa in much the same way as the panel control buttons.

When the Pump control (FIG. 6) is pushed, the pump state is toggled through all of the configured pump speeds (Off, Low, High). The Pump 4 and Pump 5 controls, if enabled, allow the user to control these special single-speed pumps. The Circulation Pump control is active with the Spa controller in the Priming Mode (activated by the reset button). In this mode the pump can be controlled as the other pumps. In normal spa mode, i.e. a mode in which the spa controller is controlling the spa operation as it is designed to do, the firmware of the spa controller has full control of the Circulation pump.

When the Blower control (FIG. 6) is pushed, the blower is toggled through all of the configured speeds (Off, Low, Med, High).

When the Option control is pushed, the user equipment is toggled On and Off. In an exemplary embodiment, this control will only be available if the spa controller is not set up to have a Mister.

When the Mister control (FIG. 6) is pushed, the mister pump is toggled On and Off, if the spa controller is set up to use the option relay for mister control.

When the Light control (FIG. 6) is pushed, the light state is toggled through all of the configured light levels (Off, Low, Med, High).

When the Fiber control (FIG. 6) is pushed, the Fiber equipment is toggled through all of the available modes (Off, Fiber+Wheel, Fiber).

The Reset button provides the user the ability to quickly de-energize all spa components.

Controls for devices not available, or not enabled by the spa controller DIP switches, will appear with greyed out labels.

The application panel (FIG. 6) includes several miscellaneous indicator LEDs. A Network Enabled LED indicates that the network option has been enabled in the User Settings file and that the last attempt to log in to the remote FTP server site was successful. The Ozone LED indicates the ozone relay has been activated. If no ozonator is present, there is no effect. The Cleanup Cycle LED indicates that the spa cleanup cycle is activated. The Filter 1/Filter 2 Cycle LEDs indicate that a spa filter cycle is activated.

Still referring to FIG. 6, the Run Test button is used to initiate a test run, beginning with the 'configure test' actions. When the button has a red blinking background, it indicates that the user should finish the test initialization actions (Test Configuration and Spa Configuration) and press the button to continue. The Abort Test button will abort a test script at the end of the current action. There are no 'End of Test' actions performed when this button is hit. The user may want to hit the Reset button after a test abort. Test reports are available for print when this action is taken, but not certificates. If this button is activated during the start of test procedure (operator entry), the test start is cancelled. The Stop Test button only becomes visible (in lieu of the 'Run Test' button) when the test script has completed one pass through the script. It gives the operator the ability to perform an orderly test stop after a number of test loops have been completed. Test reports are available for print when this action is taken, as well as spa certificates.

A No Data Acquisition indicator is only displayed if the data acquisition module is not detected by the program. Test scripts may still be run which do not require measured current (ADCM only). The Status Bar is located at the bottom of the panel (FIG. 6). It displays current information regarding the test. The Test Time indicator displays the time elapsed since the beginning of the test run. The Test Fails indicator shows the number of measurement failures since the test was started. The Spa Status indicator is used to indicate that a spa controller is not in communication with the test station. The system continually tries to maintain communication with a controller via the ADCM port 140. If a spa controller is not present this indicator will indicate 'disconnected'. The other valid modes displayed in this indicator are: Startup, Priming Mode, Normal. The Script Command indicator displays the number of the currently running script command. The Test Loops indicator displays which iteration of the main test loop is currently running. The Error Message indicator displays the most recent error message logged into the Error Display. This error can be cleared once observed so that subsequent errors continue to alert the user to additional problems.

The various areas (tabs) of the application are discussed in this section.

Test Results Tab The Test Results Table under this tab displays the results of all measurements taken by the test script. The exemplary application panel of FIG. 6 shows the panel with the Test Results tab selected.

The Error Message Display contains a list of all errors encountered by the program. The background and text change color if errors are present. This display is cleared at the beginning of each test.

The Test Loops control selects the number of times the test runs through the main body of the script before the test ends. Note that this control may also be controlled by the test script.

Checking the Single-Stepping box allows the user to pause prior to each test script command being executed. When the program is paused, the large Resume Test button will be visible and blinking.

Figure 7:
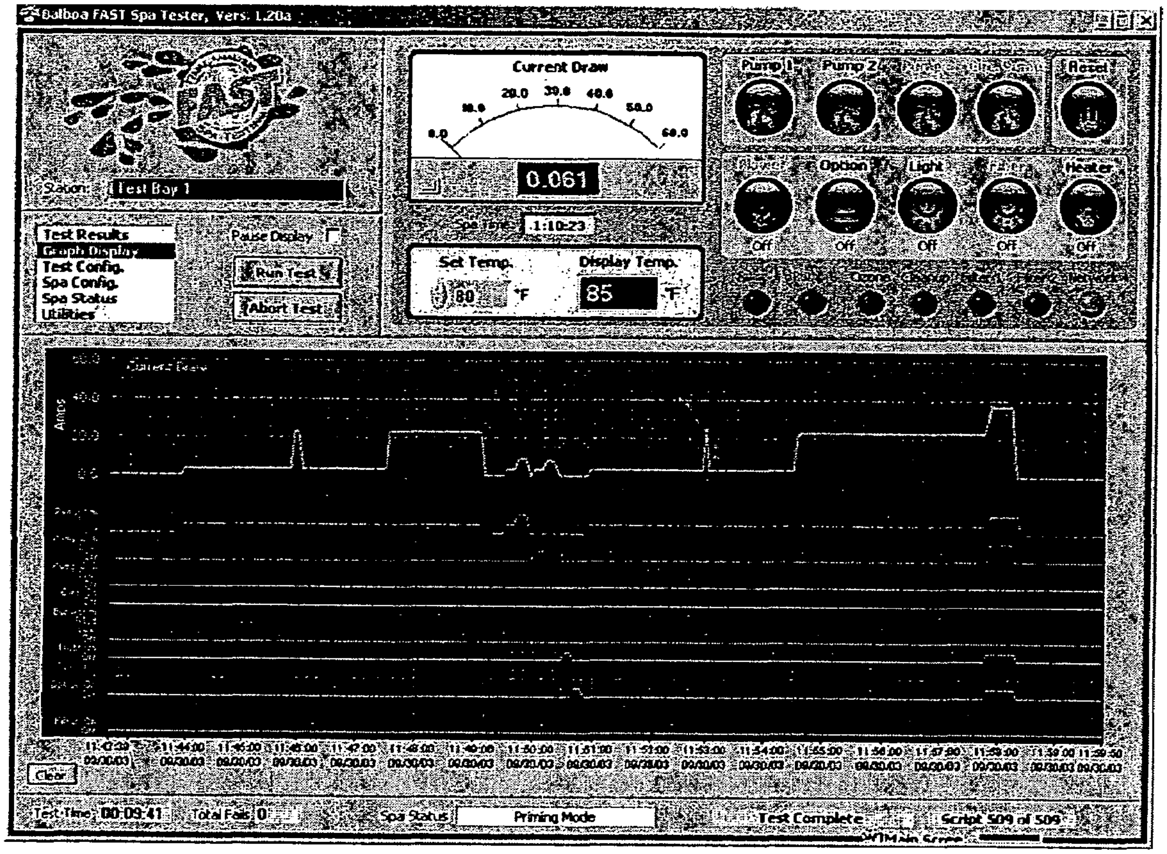
FIG. 7 is an exemplary display screen shot illustrating a graph display tab of an exemplary test application.

Graph Display Tab. This tab displays a running history buffer of test events and current levels. Graphs are cleared at the beginning of a test run, or the beginning of a new spa connection. The sample interval and buffer size of the graph are configurable on the Test Configuration tab. FIG. 7 is an exemplary display screen shot illustrating the graph display tab.

The upper section of the Current Draw graph displays the current draw as sampled at the interval specified. The lower portion of the graph converts the states of various spa devices, as well as the current reading, into a strip-chart format. The graph records as long as a controller is connected. The time span of the graph can be changed by entering a different value into the left, or right X-axis coordinates. The Clear graph button allows the user to restart the graph at any time. The graph is also cleared whenever a different spa is connected to the station.

Figure 8:
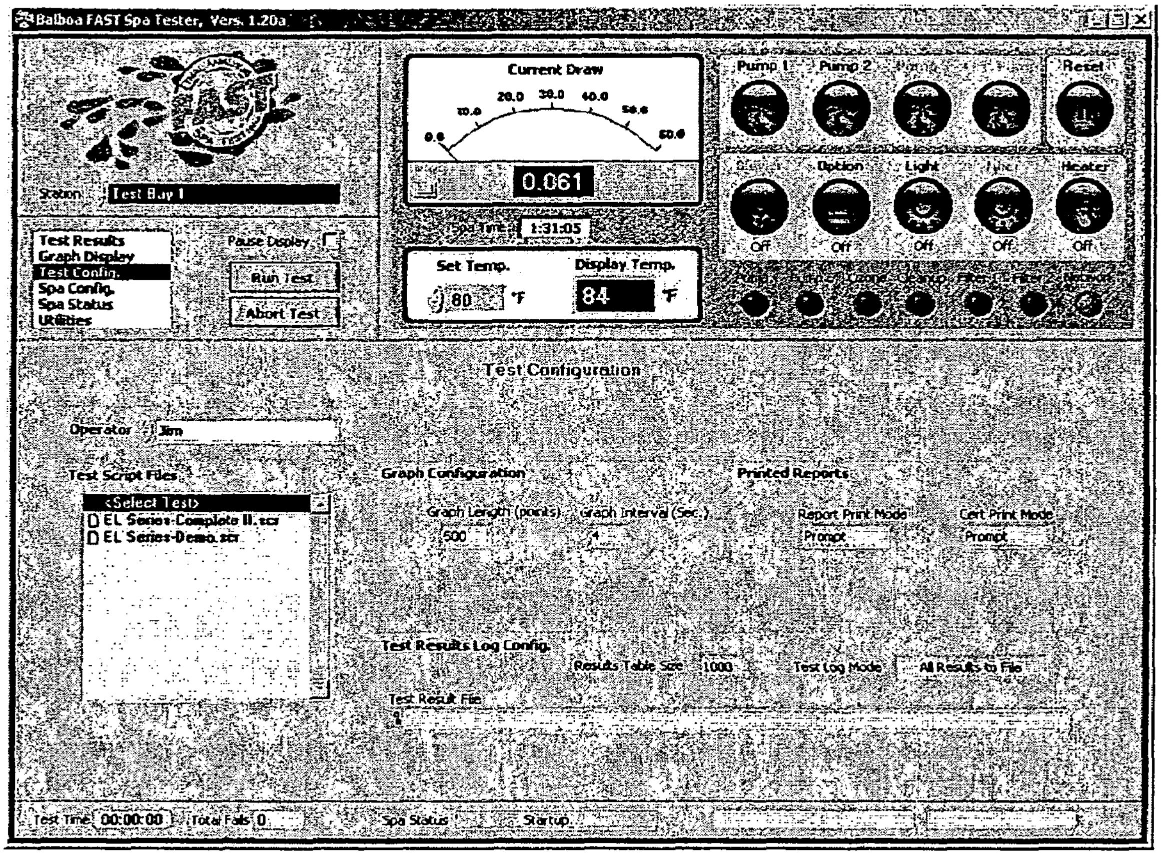
FIG. 8 is an exemplary display screen shot illustrating a test configuration tab selected from the application panel.

Test Configuration Tab. This tab is viewable at any time, and invoked when a test is run. It provides the Operator and Test Script selection. FIG. 8 is an exemplary display screen shot illustrating the test configuration tab selected from the application panel.

The Operator Selection listbox contains the pre-defined list of operators (as configured). The operator selection is used for logging purposes only. The name of the operator appears in the test result file.

The Test Script File Selection listbox contains the names of all Test Scripts that have been loaded into the test station application to run on the tester. This is the "test program" to be run on the spa. The test scripts, in an exemplary embodiment, are designed to test the configured device connections, operation, and current draws at the available speeds. ADCM status from the spa controller allows the test script to determine what is available to test.

Figure 9:
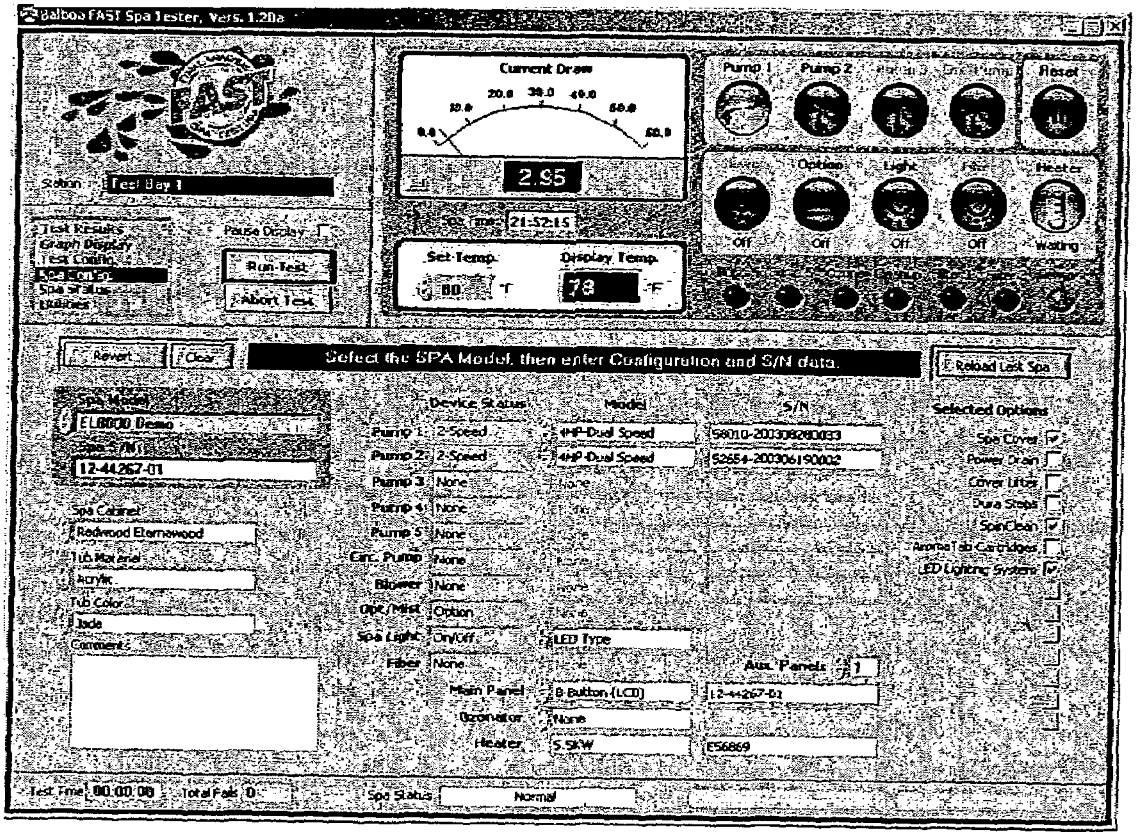
FIG. 9 illustrates a display screen shot of an exemplary spa configuration tab.
Figure 10:
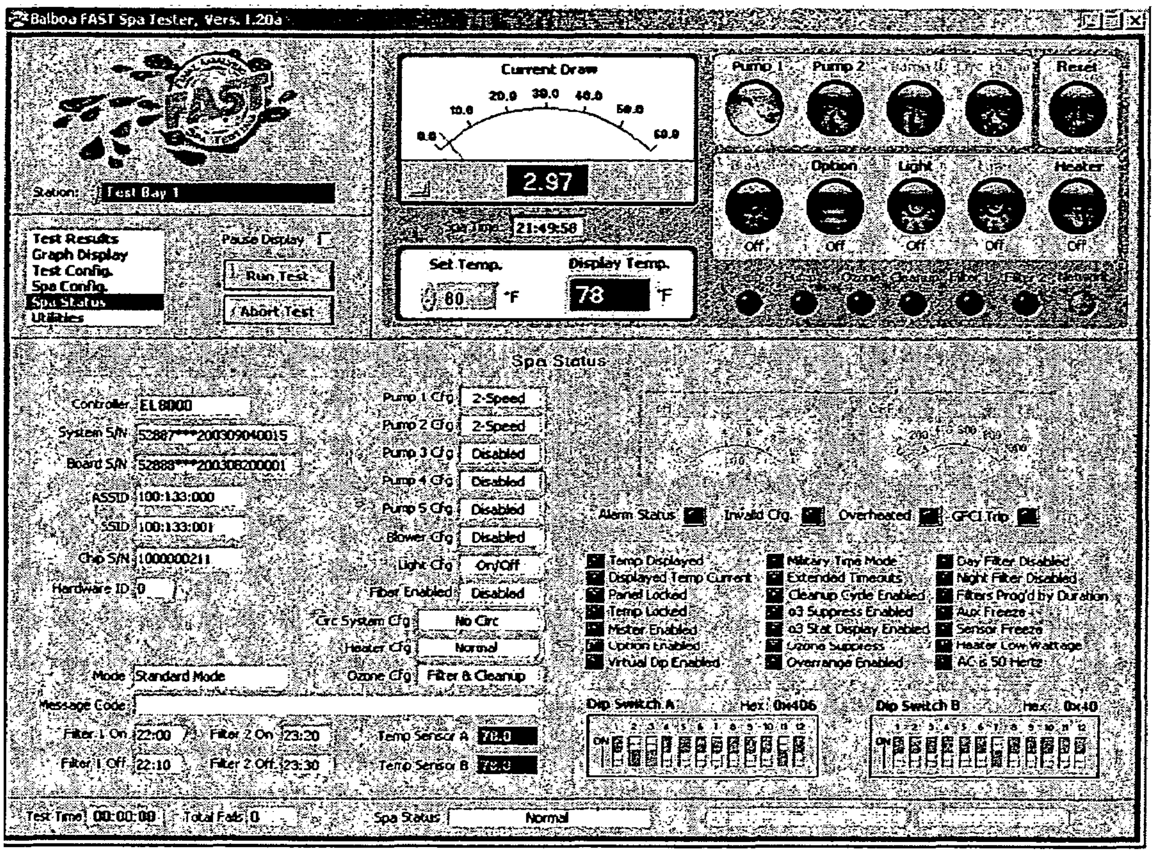
FIG. 10 is an exemplary display screen shot of a spa status tab.

Spa Configuration Tab. This tab is invoked when a test is run. At that time, the Device Status indicators are updated to reflect the configuration of the presently connected spa. When the operator selects a spa model from the drop-down list, all model selections and options will populate this screen. If the correct model has been selected, the only remaining red selections will typically be the Spa S/N and perhaps the Tub Color. FIG. 9 illustrates a display screen shot of an exemplary spa configuration tab. In this embodiment, mismatches between the selected, and connected spa can be indicated in red. Red selections that are not <Select> are interpreted as "The wrong spa selection" and the controls are disabled. The operator will not be allowed to start a test on the spa if this occurs. The basic two types of violations are 1) Device configured, but not seen on the connected spa, or 2) Device seen on connected spa, but configured as "None" in the User Settings.

The Spa S/N is required to commence a test in this exemplary embodiment. All other S/N's are recommended but optional.

There are drop-down lists originating from the information entered via the User Settings utility, for spa equipment and components, including pump models, blower models, heater models, spa cabinets, tub, colors, etc. This information includes a set of options defined by the user, and is kept in the user configuration files.

The Selected Options selections have no functional effect on the test, but allow the program to log the contents of the spa for tracking purposes. The same applies to the Comments field and Aux Panels field. The model selections "tell" the program how much current each device should draw in the different states. If these are not selected correctly, test failures will occur.

The Reload Last Spa button frees the operator from having to re-enter the OS/N's of a spa should the test need to be restarted.

In an exemplary embodiment, the test station Bar Code reader is programmed to accept a S/N then proceed to the next available S/N field.

For each spa component that the software detects, the user is offered an entry for Model and S/N. (If there is no pump 3, for example, then these options are disabled for that device). The test station software receives the spa component information by reading the ADCM status packets received from the spa under test.

Spa Status Tab. The spa status tab shows the parsed results of the ADCM packets retrieved from the unit on a continual basis. This information, plus the Current Draw reading make up the ADCM data packets which can optionally be uploaded to the remote FTP server.

The Controller Type indicates a particular spa controller model. The Firmware and S/N numbers are written into memory at the controller manufacturer and can be viewed here. Several Spa Status LED's indicate the status of several spa characteristics (e.g. Celsius mode, Mister Enabled, Option Enabled, etc.)

The DIP Switch Status indicator shows the visual and hexadecimal setting of the DIP switches on the spa controller unit as defined at the last power-up sequence, by receipt of the ADCM status data packet from the spa controller. In one exemplary embodiment, the test scripts are written to fully test the functionality of the configured spa devices. The DIP switch states are processed at the beginning of the test to determine what test actions are to be taken. In one exemplary embodiment, the DIP switches should be correctly set with power cycled if necessary, before the test is run, so that all devices are correctly tested for a given spa model.

Figure 11:
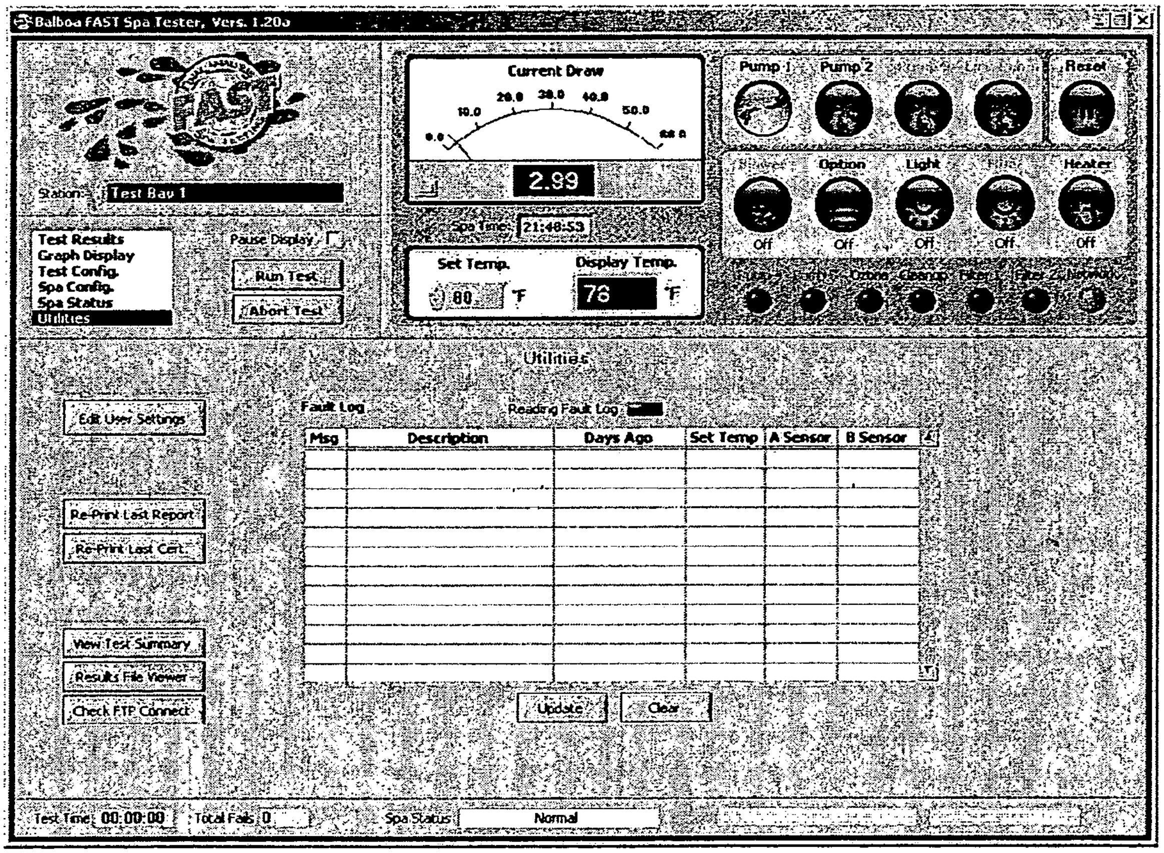
FIG. 11 shows a display screen shot of an exemplary utilities tab of the application panel.

Utilities Tab. This tab contains several utility programs within the test application. FIG. 11 shows a display screen shot of an exemplary utilities tab of the application panel.

One utility is the Fault Log. One type of spa controller can track observed failures and store them in non-volatile memory on the spa controller. Pressing the update button causes the program to retrieve and display these internal fault messages.

The Check FTP Connect button checks the status of the network connection, as well as the FTP user name. If the system can successfully log in to the site, a 'pass' message is temporarily shown in the upper panel section, otherwise fail is indicated and the Network LED is turned off.

The Re-Print Last Report feature is available to enable the user to generate multiple printouts of the report, or recover from printer difficulties at the time of the original test results report.

The Re-Print Last Certificate feature is available to enable the user to generate multiple certificates, or recover from printer difficulties at the time of the original certificate print.

Figure 11A:
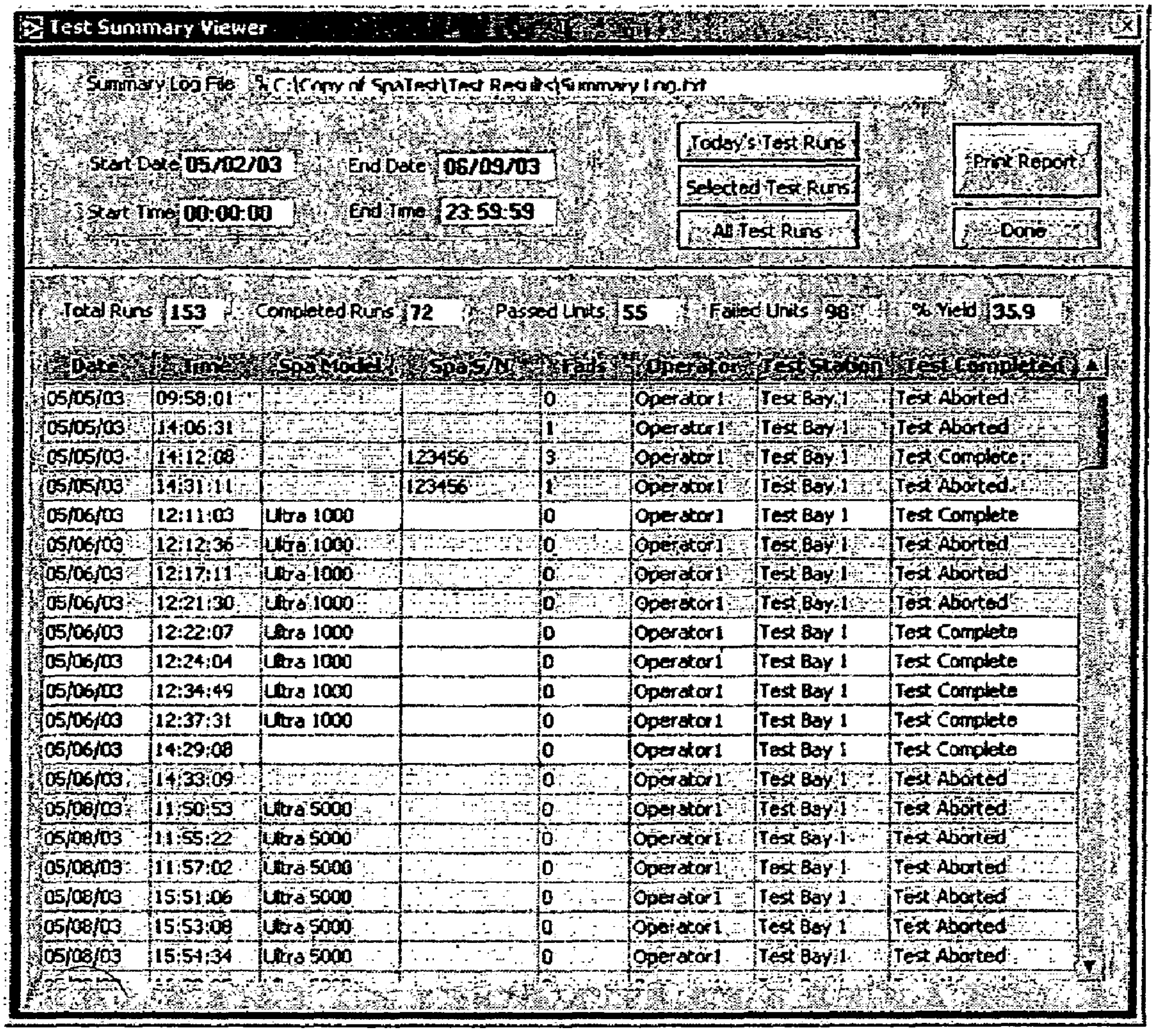
FIG. 11A shows an exemplary display screen shot of an exemplary summary test results display.

The Viewing test Summary Log utility allows the user to quickly view the summary test results of units run on the test station during a given time interval. The time span is modifiable, and printed reports are available. FIG. 11A shows an exemplary display screen shot of an exemplary summary test results display.

Figure 11B:
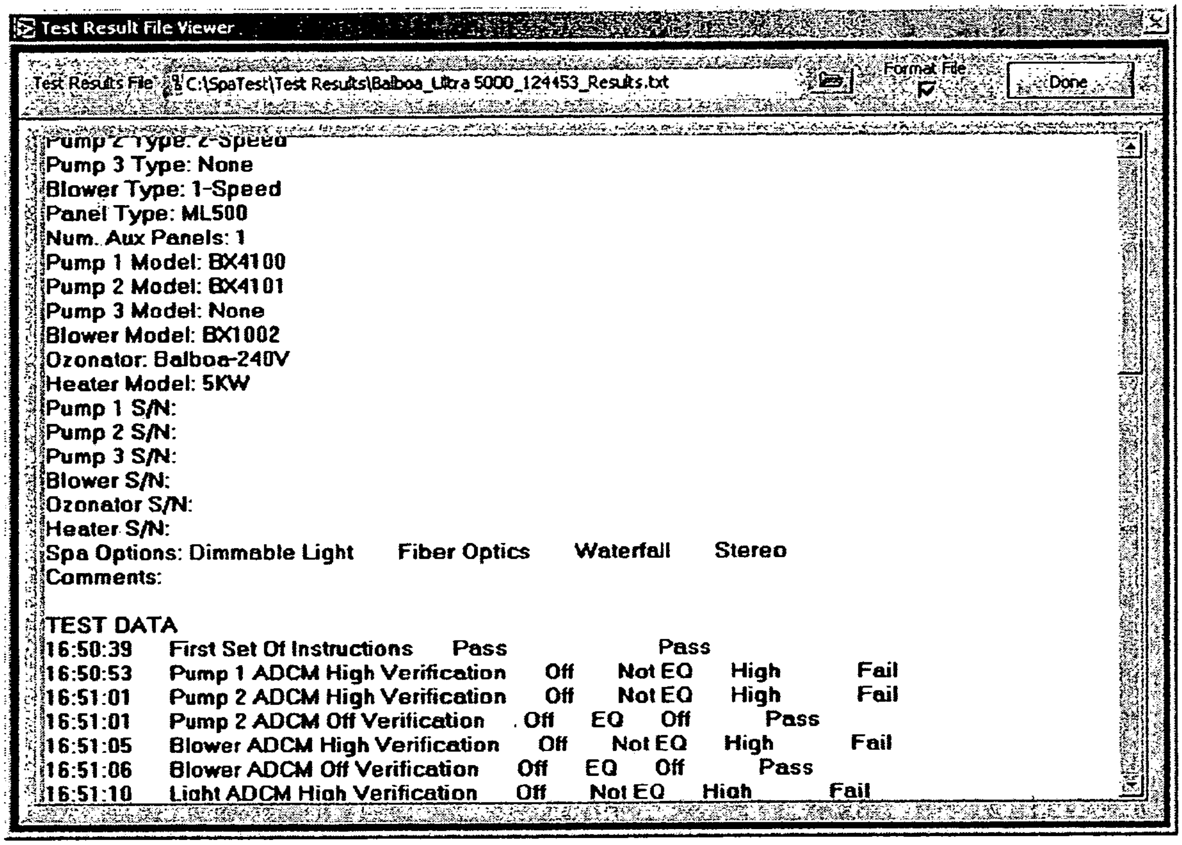
FIG. 11B shows an exemplary display screen shot of exemplary test results files.

The Viewing Test Result Files viewer is provided to quickly access the details of the test results gathered by the test station. Files are available on a Model/Serial Number basis. These are the same files that can be sent to the FTP site upon test completion. FIG. 11B shows an exemplary display screen shot of an exemplary test results file.

The User Settings Utility gives the spa test application the ability to adapt the test behavior to accommodate a specific user (based on his pumps, blowers, heaters, misters, options, special options, cabinet types, colors, tub materials etc.). Setting up the parameters in this utility is the first step in preparing the test station for use. This utility is entered from the "utilities" tab on the application panel. The following Table shows a sample of a file generated by this utility.

TABLE

| User Settings File Format |
| --- |

```
[COMPANY]
Company=BALBOA
FTP__Address=www.spatest.com
FTP__Username=BALBOAFTP
NetworkEnable=1
[TESTER]
TestStations=Test Bay 1,Test Bay 2,Test Bay 3,Test Bay 4
Operators=Operator1,Operator2,Operator3,Operator4
[SPA MODELS]
Spa0=EL8000-No Circ,0x406,0x38F,Maple
Stain,Acrylic,<Select>,ML700,2,Century,Century,Century,Pump 4 Model,Pump 5
Model,None,Mark,5.5KW,LED Type,Bulb Type,ACME Mister Pump,one,Stereo,
Chemical Dispenser,Skimmer
Spa1=EL8000-Circ,0x702,0x30F,Cedar Stain,Fiberglass,Galaxy
Green,ML700,1,Century,Century,Century,None,None,CIRC__Pump
1,Mark,5.5KW,None,Bulb Type,ACME Mister Pump,None,Waterfall,-,Chemical
Dispenser
Spa2=EL5000-Circ-Fiber,0x104,0x48E,GrayStain,Acrylic,Flourescent
Pink,ML700,1,BX4101,BX4101,None,None,None,Century Circ,BX1004,5.5KW,LED
Type,Bulb Type,None,Balboa-240V,Waterfall,Stereo,Chemical
Dispenser,Skimmer,Fountain of Youth
Spa3=EL8000-No Circ,0x406,0x38F,Maple
Stain,Acrylic,<Select>,ML700,1,Century,Century,Century,None,None,None,Mark,5.5
KW,LED Type,Bulb Type,ACME Mister Pump,None,Waterfall,-,Chemical
Dispenser,Skimmer
Spa4=EL5000-No Circ-Fiber,0x104,0x49E,Maple
Stain,Acrylic,Seaspray,ML700,1,BX4101,BX4101,None,None,None,None,BX100
4,5.5KW,
LED Type,None,None,Balboa-240V,Waterfall,-,Chemical Dispenser,-,Fountain of
Youth
Spa5=EL2000-Circ-No Blower,0x104,0x92,Gray
Stain,Acrylic,Carribean,ML700,1,BX4101,BX4101,None,None,None,Century
Circ,None,5.5KW,LED Type,None,None,None,Waterfall,Stereo,Chemical
Dispenser, Fountain of Youth
Spa6=EL2000-No Circ-Blower,0x100,0x96,Maple
Stain,Acrylic,Seaspray,ML700,1,BX4101,BX4101,None,None,None,None,Mark,5
.5KW,LE
D Type,None,None,None,Waterfall,-,-,Skimmer,Fountain of Youth
[SPA MATERIALS]
Cabinets=Cedar Stain,Maple Stain,Gray Stain
TubMaterials=Acrylic,Fiberglass
TubColors=Galaxy Green,Carribean,Seaspray,Flourescent Pink,Purple-ish Green
Panels=ML500,ML700,ML900
Options=Waterfall,Stereo,Chemical Dispenser,Skimmer,Fountain of Youth
[PUMPS]
Pump0=BX4101,4.00,8.00
Pump1=BX4102,6.00,10.00
Pump2=BX4103,8.00,12.00
Pump3=Century,3.00,8.00
FAST Test User Manual Rev. Date: Oct. 1, 2003
[CIRC__PUMPS]
Circ0=CIRC__Pump 1,1.00
Circ1=CIRC__Pump 2,2.50
Circ2=Century Circ,4.40
[BLOWERS]
Blower0=BX1002,2.50,5.00,8.00
Blower1=BX1004,4.50,8.00,11.00
Blower2=BX1006,6.50,9.00,13.00
Blower3=BX1008,7.50,10.00,14.00
Blower4=BX10010,8.50,12.00,14.00
Blower5=Mark,2.10,2.90,3.50
[SPA__LIGHTS]
Light0=Incandescent,0.05,0.10,0.20
Light1=LED Type,0.03,0.09,0.15
[FIBER]
Fiber0=Bulb Type,0.00,0.00
Fiber1=LED Type,0.40,1.10
[OPTIONS]
Option0=ACME Mister Pump,2.25
Option1=ACE Mister Pump,1.75
Option2=User Device1,5.00
Option3=User Device2,10.00
[OZONATORS]
Ozonator0=Balboa-120V,5.50
Ozonator1=Balboa-240V,7.50
Ozonator2=Brand-X,11.50
[HEATERS]
```

TABLE-continued

| User Settings File Format |
|---|
| Heater0=5.5KW,20.50 |
| Heater1=4.0KW,16.80 |
| [CERTIFICATE] |
| Cert__JPEG=C:\\FAST Spa Test\\Files\\Certificate\\Generic Certificate.jpg |
| Cert__Text=Congratulations on purchasing your new Spa. |
| Cert__ClosingComment=We hope you will enjoy your spa for many years to come. |
| Cert__Signatory=John L. Smith, Director of All |
| Cert__SignatureFile=C:\\FAST Spa Test\\Files\\Certificate\\John Smith.jpg |
| [SETTINGS] |
| PrintMode=1 |
| CertificateMode=1 |
| TestLogMode=0 |
| ResultsTableSize=1000 |
| GraphPoints=500 |
| GraphSampleInt=4 |

The User Profile Tab under the User Settings utility provides report and Certificate print options. Test reports and spa certificates are available upon test completion. An exemplary pass test report, a fail test report and a spa certificate are shown in FIGS. 11C–11E. The "Test Results Print," and "Certificate Print" listboxes offer the user the following options for printing:

1. None—No printouts are generated for the selected item.

2. Automatic—Automatic printout of test reports, Automatic certificate printouts on a passed test.

3. Prompt—Prompt for printing report at the end of the test run. Same for certificate if the test is passed.

Test results are written to a file based on the Model and serial number of the spa entered at run-time. Multiple runs on the same model and serial number are appended to the existing file. The Test Result File indicator shows the file name assigned by the program.

A Test Log Mode selector allows the measurements written to the Test Results file to be handled in the following way:

1. All results—Header and all test results are written to the results file for this S/N.

2. Fails Only—Header and failed readings are written to the results for this S/N.

3. No Results—No results are written. This mode should only be used during troubleshooting.

Figure 11F:
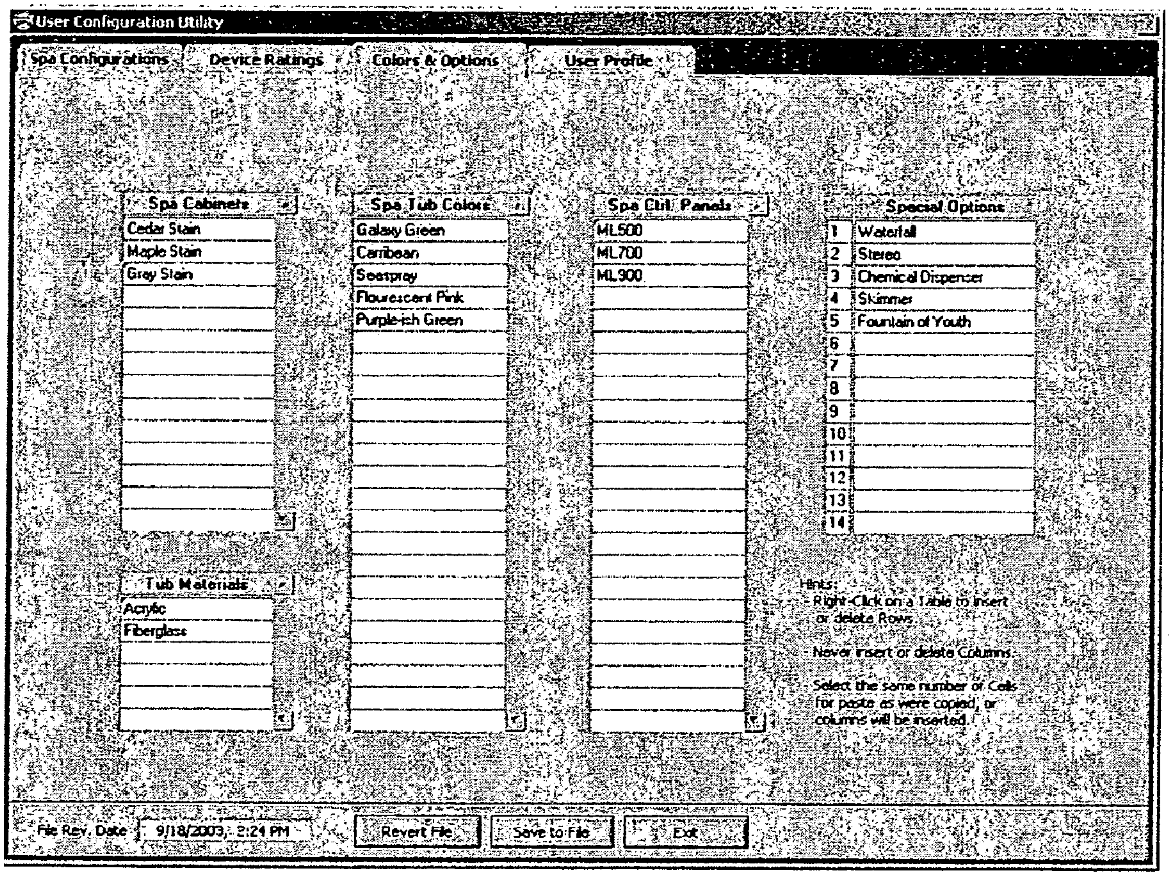
FIG. 11F shows an exemplary display screen shot of a Colors and Options tab.

The Colors and Options tab under the User Settings tab stores entries used for spa feature tracking and record keeping. These options are recorded to the Test Results file and may appear on the spa certificate. FIG. 11F shows an exemplary display screen shot of the Colors and Options tab.

Figure 11G:
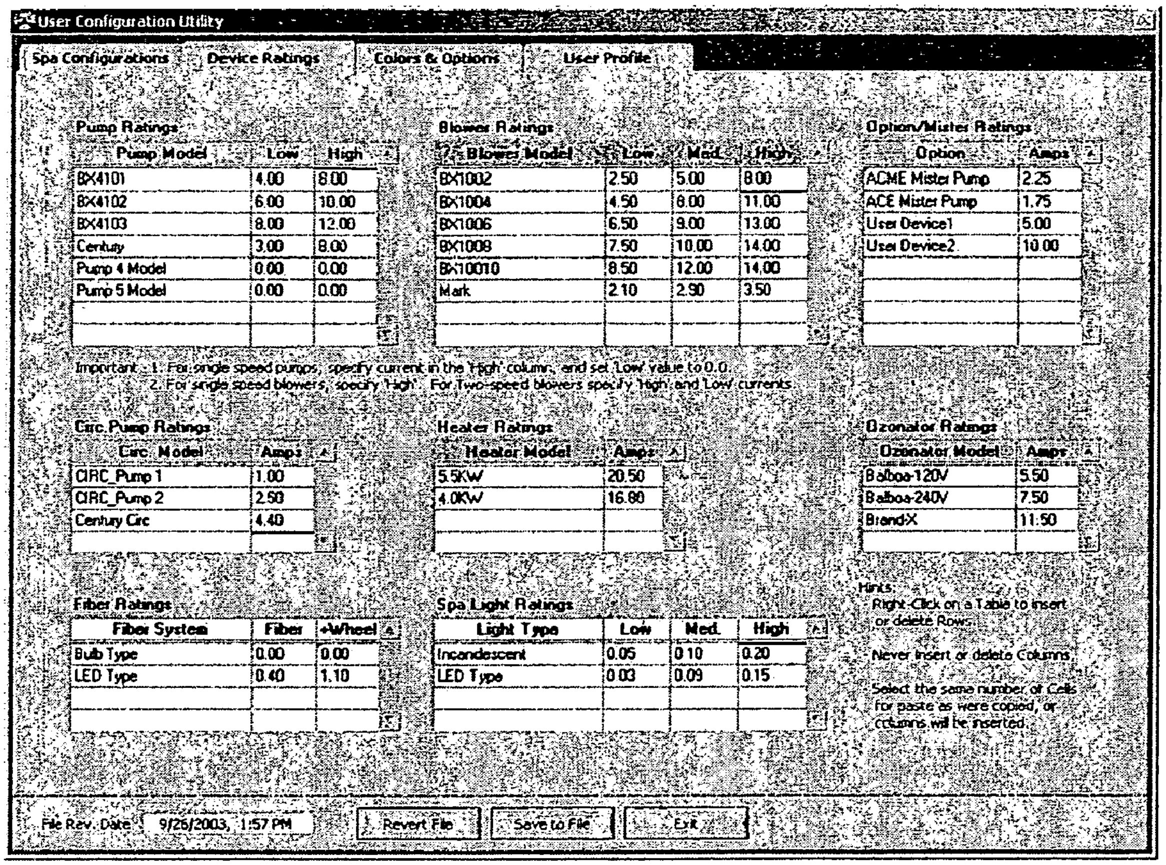
FIG. 11G shows an exemplary display screen shot of a Device Ratings tab.

The Device Ratings Tab under the User Settings tab provides a place to define all models used to build the various spa products. For each device, there is a model description and a nominal amperage draw for each of the speeds/states of the device. For single speed devices, 0.0 is entered for all lower speeds that do not apply. FIG. 11G shows an exemplary display screen shot of the Device Ratings tab. In one exemplary embodiment, nominal current draws less than 0.2 A will not be quantitatively checked by the test script due to the sensitivity and resolution of the current measurement hardware.

Figure 11H:
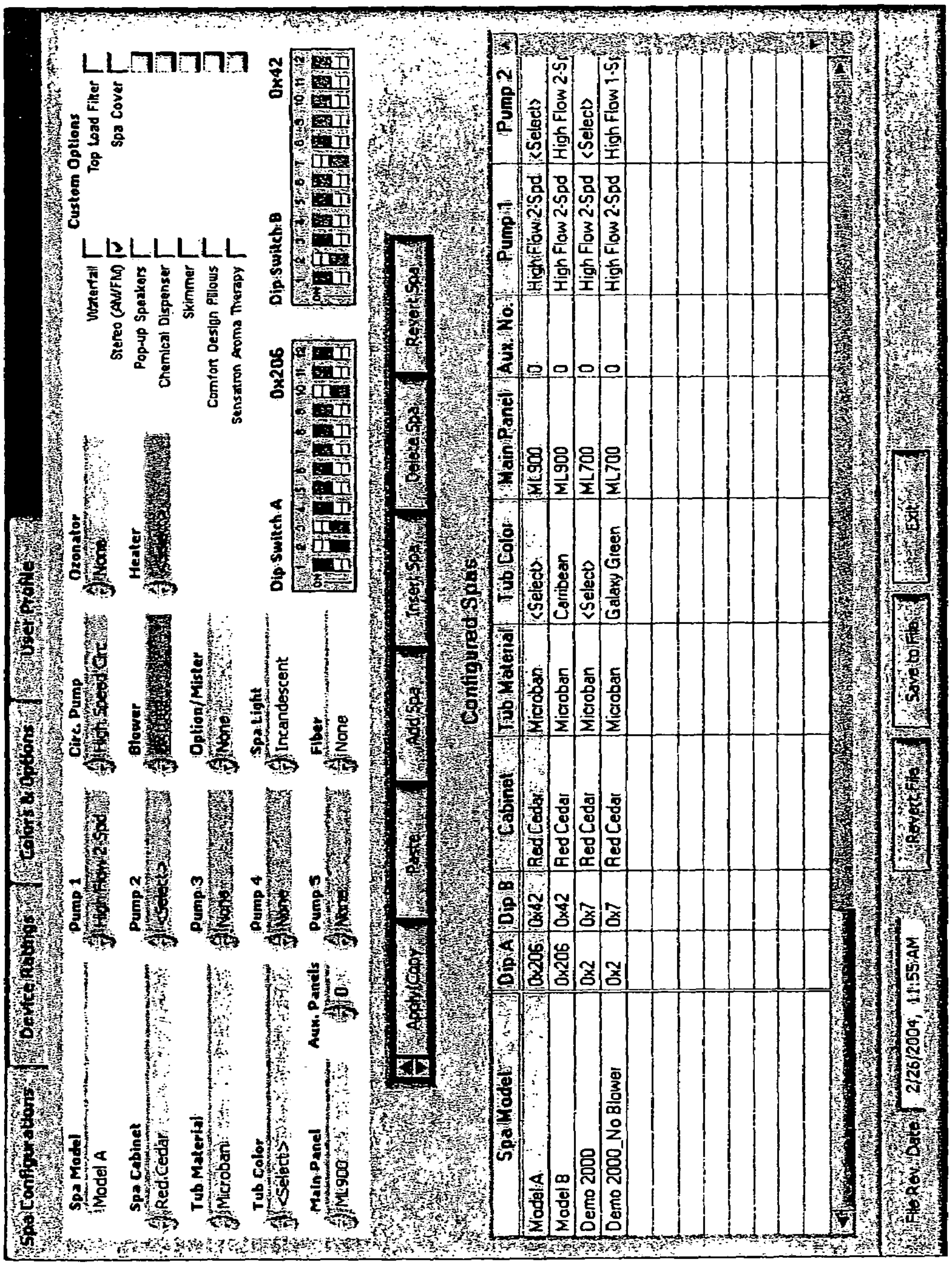
FIG. 11H shows an exemplary display screen shot of an exemplary Spa. Configuration Tab.

The Spa Configurations Tab under the User Settings tab is where the tested spa configurations are created. Spas created here are available to the operator in the drop-down list at test run time. The upper section of this panel provides the interface for modifying the configuration. The lower section (table) shows the summary of what has been created. FIG. 11H shows an exemplary display screen shot of an exemplary Spa Configuration Tab.

In an exemplary embodiment, upon completion of the necessary User Settings actions, the station is ready to run a test on a configured spa. Pressing the Run Test button (application panel, FIG. 6) will initiate the sequence of Test Script/Operator selection and Spa selection, and begin the test. Results will begin to appear in the table.

Figure 12:
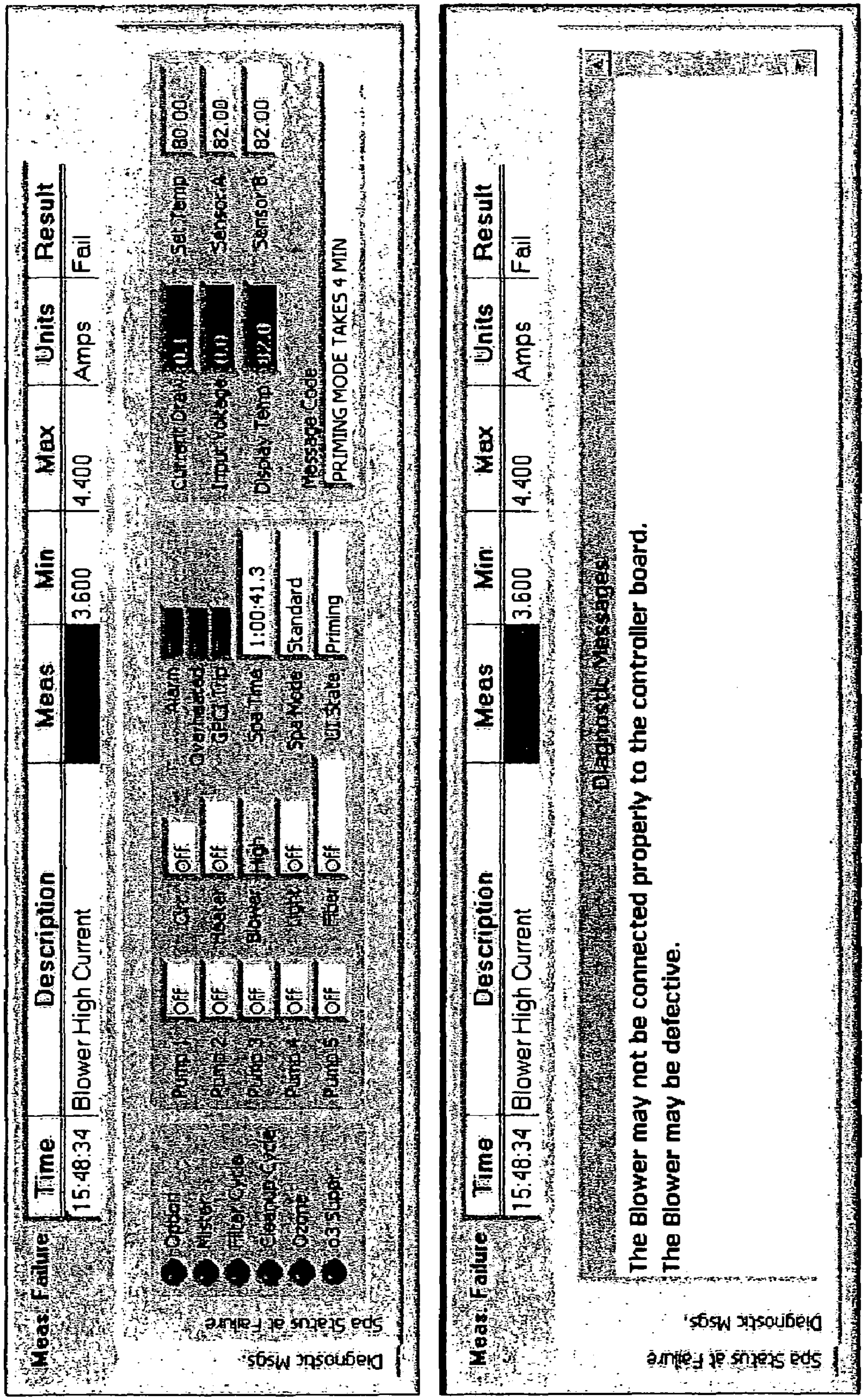
FIG. 12 shows an exemplary diagnostic display panel.

The program can assist the operator in locating the cause for test failures obtained during a test run. A diagnostic panel displays the top reasons why a measurement may have failed a test. To access the diagnostic panel, the user clicks, using the mouse, in the row of the test results table where the failure occurred. If the top reasons are determined not to be the cause of the failure, the operator may then proceed with the fault tree diagnosis to further locate the problem. An exemplary diagnostic display panel is shown in FIG. 12, with a diagnostic message for a blower high current failure.

In an exemplary embodiment, the test station is protected by a security key. It is necessary to have the key installed in one of the USB ports on the computer in order to launch the application. If the key is not present, an error message will alert the user, and the application will terminate. If the key is removed after the application is started, the user will be given a warning that the key can no longer be detected. After approximately 30 seconds the application will terminate.

The test station and testing method can find use by spa fabricators to test a fully assembled spa at a factory or distribution center. Other exemplary applications include use to test a fielded spa, e.g. by a service technician. The test station application software can be loaded onto a laptop computer, and the service technician can hook up the current sensor to the line voltage connection to the spa with a data acquisition module as needed, and the data connection between the computer and the spa controller.

Although the foregoing has been a description and illustration of specific embodiments of the invention, various modifications and changes thereto can be made by persons skilled in the art without departing from the scope and spirit of the invention as defined by the following claims.

What is claimed is:

1. A method for testing a spa system which includes a spa tub for holding water, an electronic controller system which controls the spa system functions, a plurality of controlled devices controlled by the controller system including a pump for recirculating water in the tub, and a heater for heating water, wherein said spa system has a spa configuration comprising an installed set of controlled devices, the method comprising:

selecting a spa configuration from a set of a plurality of spa configurations stored in an electronic memory;

exercising the plurality of controlled devices during a testing regime, wherein said exercising the plurality of controlled devices during a testing regime comprises running a test script stored in an electronic memory in dependence on said spa configuration;

monitoring an electrical current drawn by the spa system;

determining whether the electrical current drawn by the spa system during the testing regime is consistent with an expected current profile.

2. The method of claim 1, further comprising:

filling the spa tub with water before exercising the plurality of controlled devices.

3. The method of claim 1, wherein said exercising the plurality of controlled devices comprises:

conducting a pump cycle comprising turning the pump on, running the pump for a time, and turning the pump off.

4. The method of claim 1, wherein said exercising the plurality of controlled devices comprises:

turning the heater on, and subsequently turning the heater off.

5. The method of claim 1, wherein said exercising the plurality of controlled devices further comprises:

turning a blower fan on, and subsequently turning the fan off.

6. The method of claim 1, wherein said exercising the plurality of controlled devices further comprises turning a spa light on, and subsequently turning the spa light off.

7. The method of claim 1, wherein said exercising the plurality of controlled devices comprises:

sending a command or set of commands from a test station to the electronic controller of the spa system to turn on and turn off one or more of the controlled devices.

8. The method of claim 1, further comprising:

generating a test report indicative of operability of the spa under test during the test regime.

9. The method of claim 8, wherein the test report includes listing of test results for each controlled device, and reflects a pass or fail test state.

10. The method of claim 1, further comprising:

printing a certificate indicative of a successive test result if the spa under test operates normally during the testing regime.

11. The method of claim 1, wherein the spa system further includes a spa control panel for entering spa commands, the method further comprising:

testing the spa control panel.

12. A method for testing a spa system which includes a spa tub for holding water, an electronic controller system which controls the spa system functions, a plurality of controlled devices controlled by the controller system including a pump for recirculating water in the tub, and a heater for heating water, the method comprising:

exercising the plurality of controlled devices during a testing regime;

monitoring an electrical current drawn by the spa system;

determining whether the electrical current drawn by the spa system during the testing regime is consistent with an expected current profile;

wherein said exercising the plurality of controlled devices comprises:

operating each of said plurality of controlled devices one at a time to isolate the current drawn by each controlled device;

and wherein said determining whether the electrical current drawn by the spa system during the testing regime is consistent with an expected current profile comprises:

comparing a measured current drawn by one of said controlled device to a nominal current draw value for said one of said controlled device which has been stored in an electronic memory.

13. A method for testing a spa system which includes a spa tub for holding water, an electronic controller system which controls the spa system functions, a plurality of controlled devices controlled by the controller system including a pump for recirculating water in the tub, and a heater for heating water, the method comprising:

exercising the plurality of controlled devices during a testing regime;

monitoring an electrical current drawn by the spa system;

determining whether the electrical current drawn by the spa system during the testing regime is consistent with an expected current profile;

wherein said exercising the plurality of controlled devices comprises operating all of said controlled devices simultaneously to measure a maximum current load of the spa; and wherein said determining whether the electrical current drawn by the spa system during the testing regime is consistent with an expected current profile comprises comparing said measured maximum current load to a nominal maximum current draw value for said spa system which has been stored in an electronic memory.

14. The method of claim 1, further comprising:

establishing a data communication link between the spa electronic controller and a test computer system;

periodically passing spa status data over the data communication link from the spa electronic controller to the test computer system indicative of a status of the spa and the controlled devices;

passing commands over the data communication link from the test computer system to the spa electronic controller for execution by the spa electronic controller.

15. A method for testing a spa system which includes a spa tub for holding water, an electronic controller system which controls the spa system functions, a plurality of controlled devices controlled by the controller system including a pump for recirculating water in the tub, and a heater for heating water, the method comprising:

connecting a test station to the spa system under test;

exercising the plurality of controlled devices during a testing regime;

providing power sensor signals to the test station indicative of a magnitude of electrical power drawn by the spa system during the testing regime;

using the power sensor signals to generate a test report indicative of a response to the spa system under test to the testing regime;

disconnecting the test station from the spa system, wherein the test station is not connected to the spa system during normal spa operation.

16. The method of claim 15, wherein connecting the test station to the spa under test comprises:

establishing an electrical signal connection between the electronic controller and the test station to allow commands to be passed from the test station to the electronic controller.

17. The method of claim 15, further comprising:
filling the spa tub with water before exercising the plurality of controlled devices.

18. The method of claim 15, wherein said exercising the plurality of controlled devices comprises:
conducting a pump cycle comprising turning the pump on, running the pump for a time, and turning the pump off.

19. The method of claim 15, wherein said exercising the plurality of controlled devices comprises:
turning the heater on, and subsequently turning the heater off.

20. The method of claim 15, wherein said exercising the plurality of controlled devices further comprises:
turning a blower fan on, and subsequently turning the fan off.

21. The method of claim 15, wherein said exercising the plurality of controlled devices further comprises turning a spa light on, and subsequently turning the spa light off.

22. The method of claim 15, wherein said exercising the plurality of controlled devices comprises:
sending a command or set of commands from a test station to the electronic controller of the spa system to turn on and turn off one or more of the controlled devices.

23. The method of claim 15, wherein said exercising the plurality of controlled devices comprises:
operating each of said plurality of controlled devices one at a time to isolate the current drawn by each controlled device.

24. The method of claim 15, wherein said exercising the plurality of controlled devices comprises operating all of said controlled devices simultaneously to measure a maximum current load of the spa.

25. A test system for testing a spa system which includes a spa tub for holding water, an electronic controller system which controls the spa system functions, and a spa configuration including a plurality of controlled devices controlled by the controller system including a pump for recirculating water in the tub, and a heater for heating water, the test system comprising:
a current sensor for sensing a spa current drawn by the spa system and providing a sensor signal indicative of the spa current;
a test computer system;
a data link between the spa controller system and the test computer system for transmitting spa system data to the test computer system and commands from the test computer system to the spa controller system;
a set of test instructions for execution by the test computer system for generating a set of commands to the spa controller to exercise the plurality of controlled devices during a testing regime;
the test comouter system including an electronic memory or server in which is stored a plurality of sets of test instructions each corresponding to a particular one of different spa configurations, said plurality of sets of test instructions including said set of test instructions for execution by the test computer system in dependence on the particular spa configuration of the spa system under test;
the test computer system adapted to monitor said sensor signals during the testing regime and to determine whether the electrical current drawn by the spa system during the testing regime is within a predetermined specification.

26. The system of claim 25, wherein said set of test instructions comprises:
an instruction set for conducting a pump cycle comprising turning the pump on, running the pump for a time, and turning the pump off.

27. The system of claim 25, wherein said set of test instructions comprises:
an instruction set for turning the heater on, and subsequently turning the heater off.

28. The system of claim 25, wherein said set of test instructions comprises:
an instruction set for turning a blower fan on, and subsequently turning the fan off.

29. The system of claim 25, wherein said set of test instructions comprises:
an instruction set for turning a spa light on, and subsequently turning the spa light off.

30. The system of claim 25, wherein said set of test instructions comprises:
an instruction set for operating each of said plurality of controlled devices one at a time to isolate the current drawn by each controlled device.

31. The system of claim 25, wherein said set of test instructions comprises:
operating all of said controlled devices simultaneously to cause a maximum current load of the spa.

32. The system of claim 25, further comprising:
a printer for printing a test report indicative of operability of the spa under test during the test regime.

33. The system of claim 25, wherein said data link comprises an RS-232 serial data link connected to a serial port of the test computer system.

34. The system of claim 25, wherein said sensor signals are in analog form, and further comprising a data acquisition module connected to the current sensor to convert the sensor signals to digital form for processing by the test computer system.

35. The system of claim 25, further comprising a set of spa configuration data reflecting the configuration status of the spa under test and nominal current draw specifications for the spa controlled devices.

36. A test system for testing a spa system which includes a spa tub for holding water, an electronic controller system which controls the spa system functions, a plurality of controlled devices controlled by the controller system including a pump for recirculating water in the tub, and a heater for heating water, the test system comprising:
means for sensing a spa current drawn by the spa system and providing a sensor signal indicative of the spa current;
a test computer system;
means for transmitting spa system data to the test computer system and commands from the test computer system to the spa controller system during a test;
a set of test instructions for execution by the test computer system for generating a set of commands to the spa controller to exercise the plurality of controlled devices during a testing regime;
the test computer system adapted to monitor said sensor signals during the testing regime and to determine whether the electrical current drawn by the spa system during the testing regime is within a predetermined specification, the test computer system being disconnected from the spa system during normal spa operation.

37. A method for testing a spa system which includes a spa tub for holding water, an electronic controller system which controls the spa system functions, a plurality of controlled devices controlled by the controller system including a pump for recirculating water in the tub, and a heater for heating water, the method comprising:

connecting a test station to the spa system under test;

exercising the plurality of controlled devices during a testing regime;

providing power sensor signals to the test station indicative of a magnitude of electrical power drawn by the spa system during the testing regime;

using the power sensor signals to generate a test report indicative of a response to the spa system under test to the testing regime; and wherein said spa system has a spa configuration comprising an installed set of controlled devices, the method further comprising selecting a spa configuration from a set of a plurality of spa configurations stored in an electronic memory;

and wherein said exercising the plurality of controlled devices during a testing regime comprises running a test script stored in an electronic memory in dependence on said spa configuration.

38. The method of claim 37, further comprising:

entering identifying data into the test station through a data input device which is indicative of a spa configuration of the spa system under test, wherein the spa configuration is dependent on a set of installed controlled devices; and selecting the testing regime in dependence on the identifying data from a set of different testing regimes stored in an electronic memory.

39. The method of claim 38, wherein said entering identifying data comprises scanning a bar code mounted on the spa system under test.

40. The method of claim 39, wherein said entering identifying data comprises entering a serial number assigned to the spa system under test.

* * * * *